(12) United States Patent
Hausheer et al.

(10) Patent No.: US 10,926,122 B2
(45) Date of Patent: Feb. 23, 2021

(54) ADJUSTABLE HEIGHT PLYOMETRIC APPARATUS FOR VERTICAL JUMP EXERCISE OR TRAINING

(71) Applicant: KULDEMAEKR VERTICAL SOLUTIONS, LLC, Leander, TX (US)

(72) Inventors: Kurt Joseph Hausheer, Leander, TX (US); Zachary Rubenson, Milwaukie, OR (US); Alex Thomsen, Portland, OR (US)

(73) Assignee: KULDEMAEKR VERTICAL SOLUTIONS, LLC., Leander, TX (US)

( * ) Notice: Subject to any disclaimer, the term of this patent is extended or adjusted under 35 U.S.C. 154(b) by 2 days.

(21) Appl. No.: 16/309,895

(22) PCT Filed: Jun. 12, 2017

(86) PCT No.: PCT/US2017/036953
§ 371 (c)(1),
(2) Date: Dec. 13, 2018

(87) PCT Pub. No.: WO2017/218377
PCT Pub. Date: Dec. 21, 2017

(65) Prior Publication Data
US 2019/0168051 A1    Jun. 6, 2019

Related U.S. Application Data

(60) Provisional application No. 62/349,539, filed on Jun. 13, 2016.

(51) Int. Cl.
*A63B 5/16* (2006.01)
*A63B 71/00* (2006.01)
(Continued)

(52) U.S. Cl.
CPC .............. *A63B 5/16* (2013.01); *A63B 5/00* (2013.01); *A63B 17/04* (2013.01);
(Continued)

(58) Field of Classification Search
CPC .... A63B 5/00; A63B 5/16; A63B 5/12; A63B 17/04; A63B 71/0036; A63B 71/0054;
(Continued)

(56) References Cited

U.S. PATENT DOCUMENTS 1,881,475 A * 10/1932 Gibson ............... A47B 9/06
108/106
3,855,946 A * 12/1974 Bales ................. A47B 9/14
108/147.21
(Continued)

OTHER PUBLICATIONS

International Search Report dated Aug. 21, 2017 in corresponding International Patent Application No. PCT/US2017/036953.

*Primary Examiner* — Loan B Jimenez
*Assistant Examiner* — Thao N Do
(74) *Attorney, Agent, or Firm* — Medler Ferro Woodhouse & Mills PLLC

(57) ABSTRACT

An adjustable height plyometric apparatus is disclosed having a platform component, a set of base leg components, a base component to which the set of base leg components are fixedly secured, and one or more optional sets of upper leg components for attachment to the base leg components or another upper leg component. The platform component is configured to be simultaneously raised or lowered relative to the base leg components in an unlocked state and to be selectively secured thereon at any one of a selection of vertical heights in a locked state. The upper leg components are attachable to the base or other upper leg components for increasing the selection of vertical heights. Each of the upper leg components may be inserted within a respective leg (Continued)

receiving opening in a top surface of the platform component for attachment with a respective base or other upper leg component disposed therein.

16 Claims, 24 Drawing Sheets

(51) Int. Cl.
    *A63B 17/04*     (2006.01)
    *A63B 5/00*     (2006.01)
    *A63B 71/02*     (2006.01)
    *F16B 7/10*     (2006.01)

(52) U.S. Cl.
    CPC .... *A63B 71/0036* (2013.01); *A63B 2071/026* (2013.01); *A63B 2210/50* (2013.01); *A63B 2225/093* (2013.01); *A63B 2225/60* (2013.01); *A63B 2244/081* (2013.01); *F16B 7/105* (2013.01)

(58) Field of Classification Search
    CPC ........ A63B 2071/026; A63B 2244/081; A63B 2244/08; A63B 57/15; A63B 61/04; A63B 2210/50; A63B 2225/093; F16B 7/105; A47C 7/5062; A47C 7/5064; A47C 16/025; A47C 9/06; A47C 9/15; A47C 2009/145
    USPC .................................. 482/142, 15; 297/108
    See application file for complete search history.

(56) References Cited

U.S. PATENT DOCUMENTS

| | | | |
|---|---|---|---|
| 5,096,186 A | 3/1992 | Wilkinson et al. | |
| 5,116,044 A | 5/1992 | Wilkinson et al. | |
| 5,125,646 A | 6/1992 | Wilkinson | |
| 5,842,954 A * | 12/1998 | Slupskiy | A63B 5/16 482/15 |
| 6,155,435 A * | 12/2000 | Malik | A47B 57/26 108/64 |
| 7,421,956 B1 * | 9/2008 | McCarthy | A47B 9/14 108/147.21 |
| 8,216,114 B1 * | 7/2012 | Wynn, III | A63B 23/0458 482/52 |
| 10,391,357 B2 * | 8/2019 | Wang | A63B 23/0458 |
| 2002/0148394 A1 * | 10/2002 | Strong | A47B 9/14 108/147.21 |
| 2007/0087902 A1 * | 4/2007 | Penat | A63B 21/068 482/52 |
| 2009/0223425 A1 * | 9/2009 | Randall | A47B 9/14 108/147.19 |
| 2010/0171398 A1 * | 7/2010 | Berthiaume | A47B 9/14 312/195 |
| 2010/0326329 A1 * | 12/2010 | Kiekhaefer | A47B 96/06 108/25 |
| 2013/0023392 A1 * | 1/2013 | Glickfield | A63B 23/0458 482/142 |
| 2013/0137558 A1 * | 5/2013 | Ross | A63B 5/16 482/142 |
| 2013/0172160 A1 | 7/2013 | Poole | |
| 2014/0283715 A1 * | 9/2014 | Sevadjian | A47B 9/14 108/147.21 |
| 2015/0111701 A1 * | 4/2015 | Kempka | A63B 5/16 482/15 |
| 2015/0157892 A1 * | 6/2015 | Johnson | A63B 23/047 482/94 |
| 2015/0196799 A1 * | 7/2015 | Chua | A63B 23/1236 482/141 |
| 2015/0327739 A1 * | 11/2015 | Edwards | A47C 16/025 4/254 |
| 2018/0344036 A1 * | 12/2018 | Cetrangelo | A63B 21/4035 |

* cited by examiner

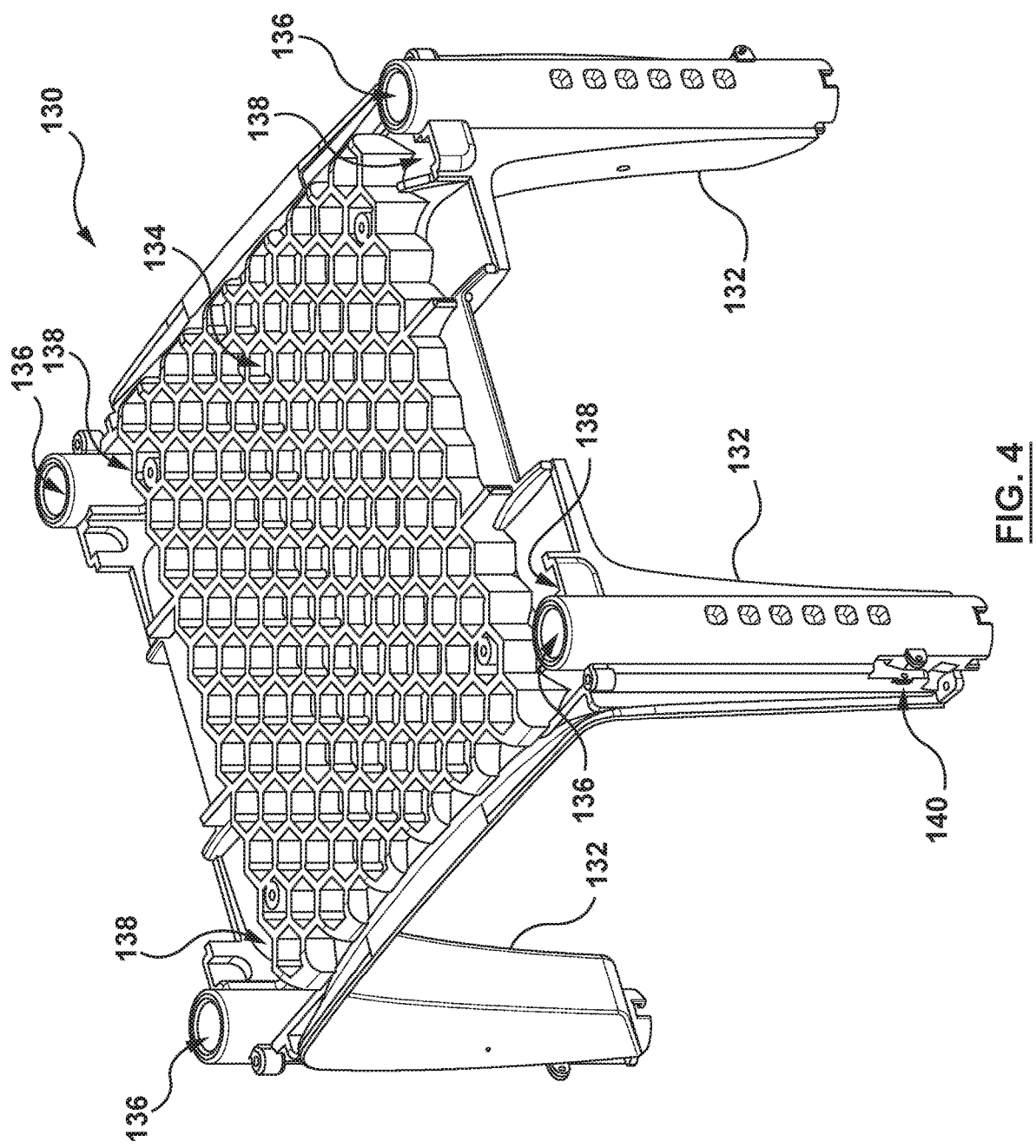

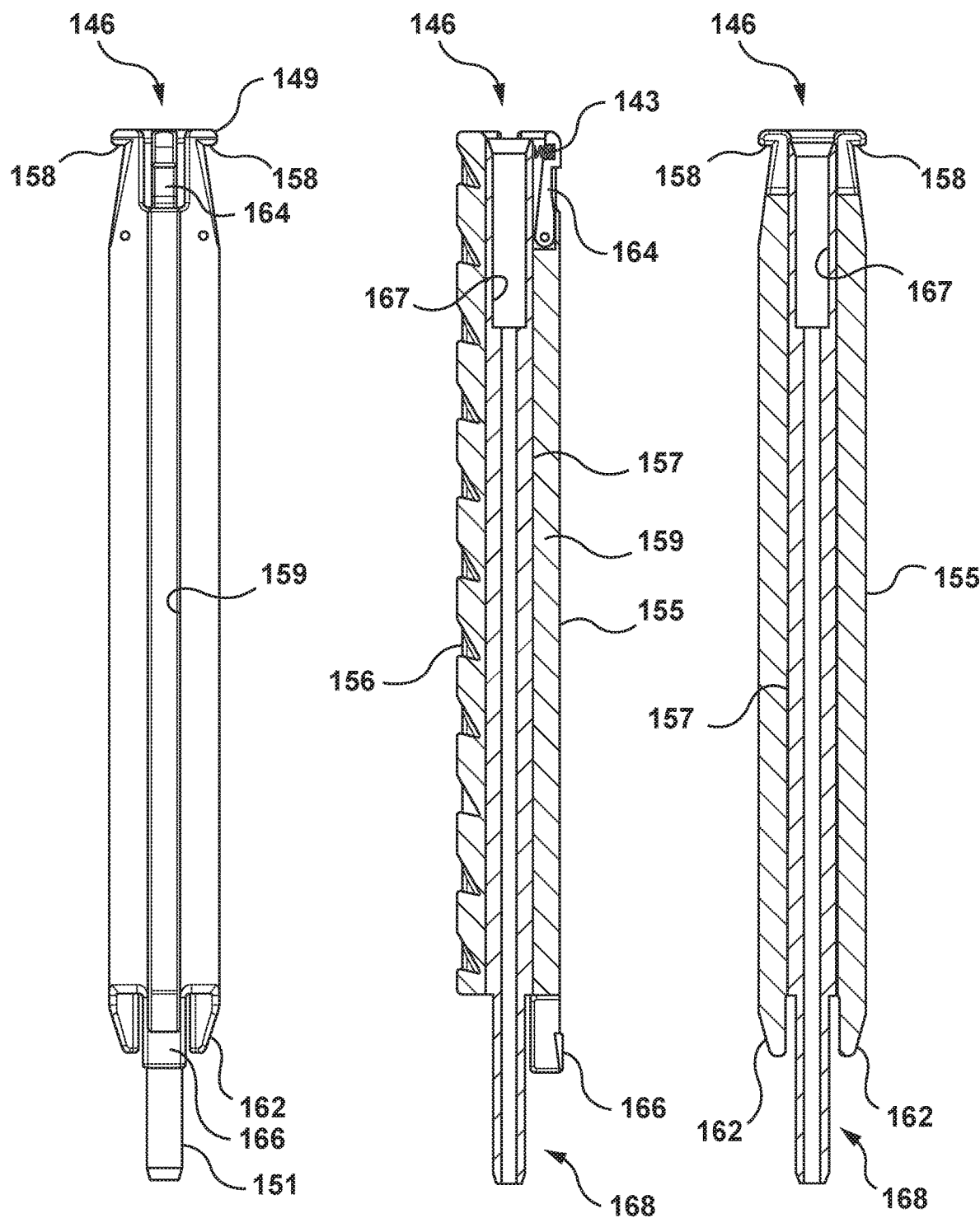

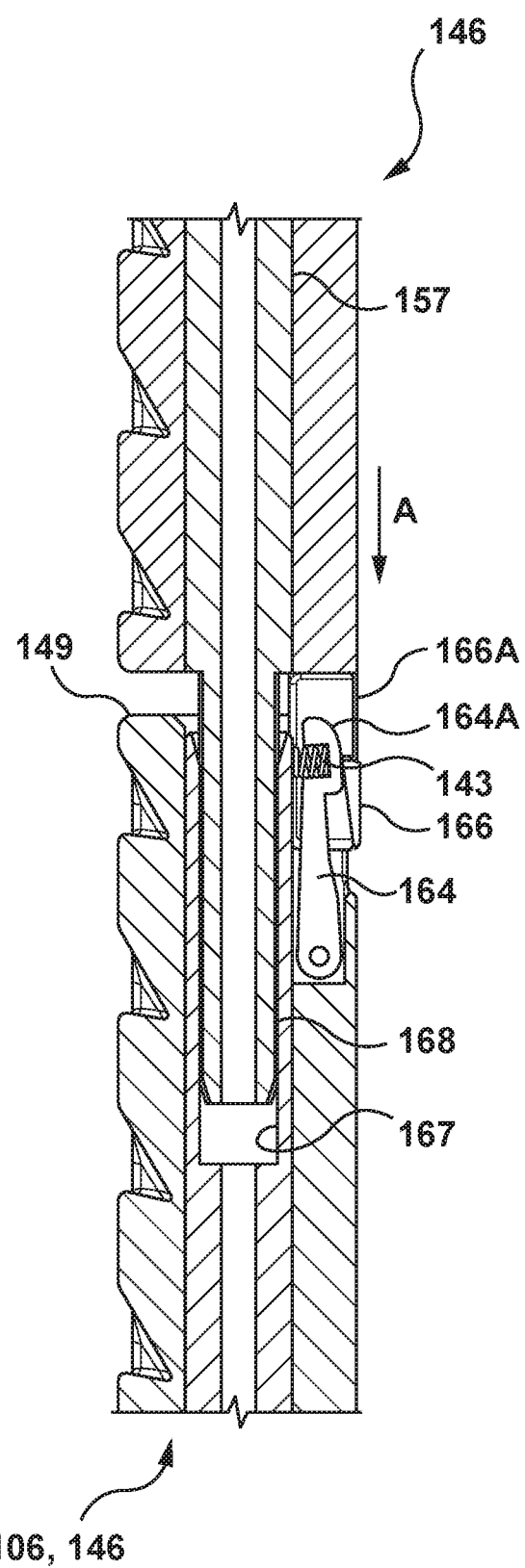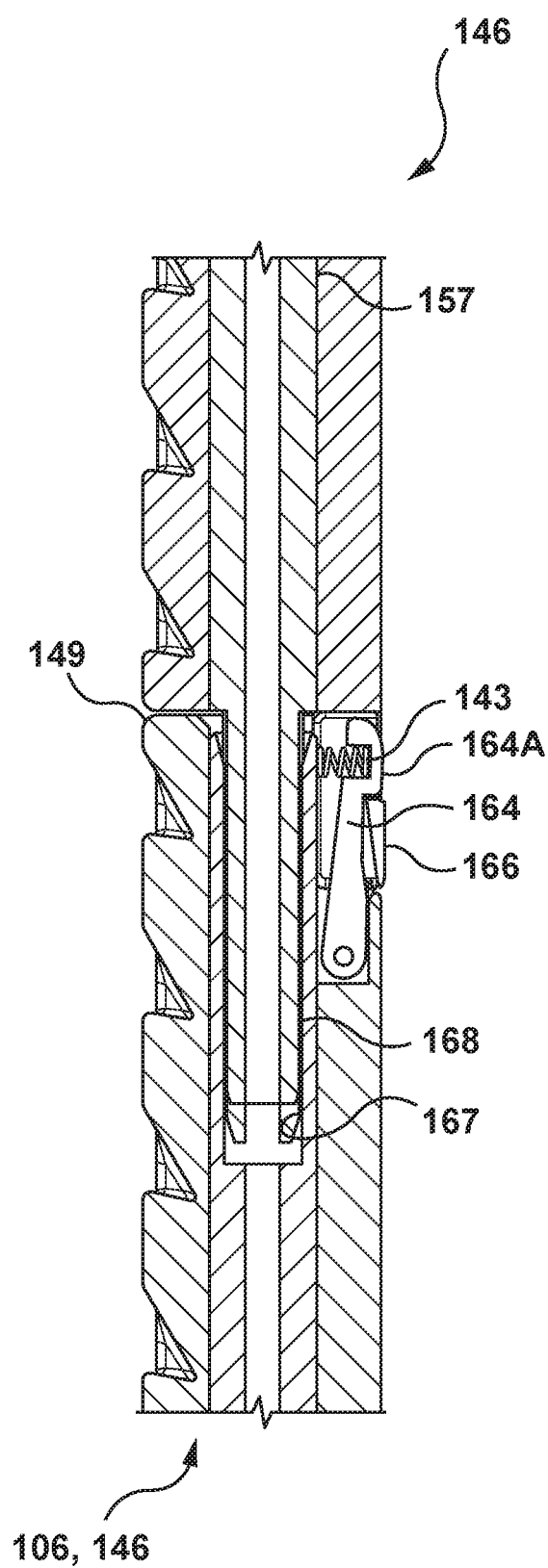

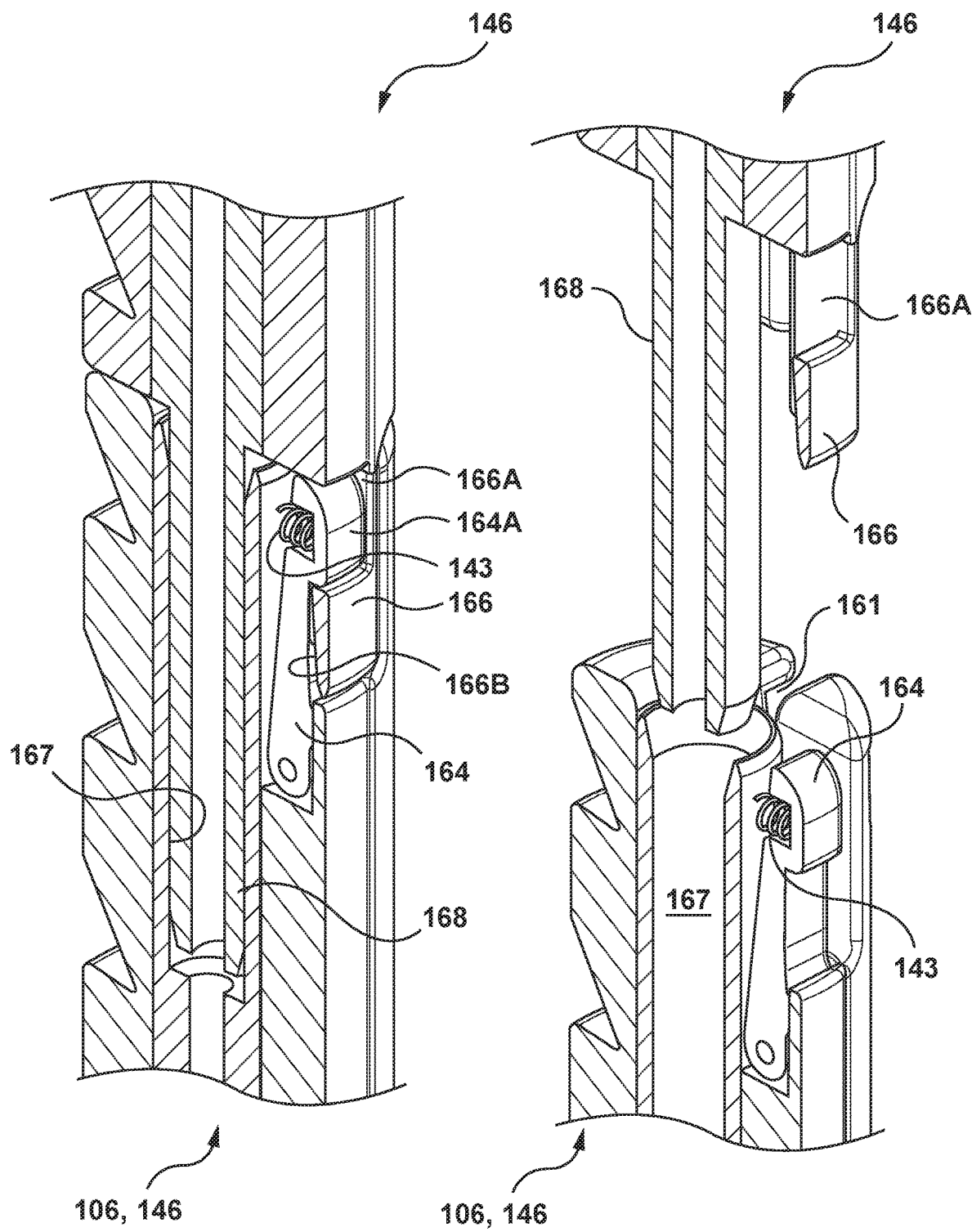

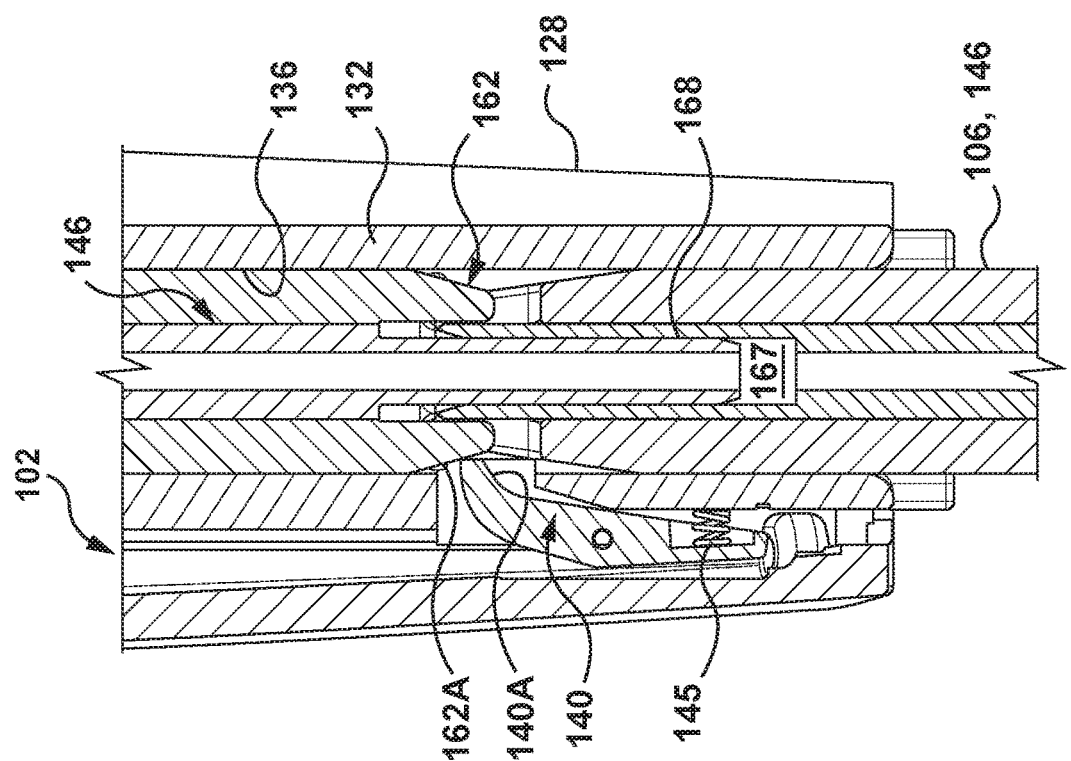
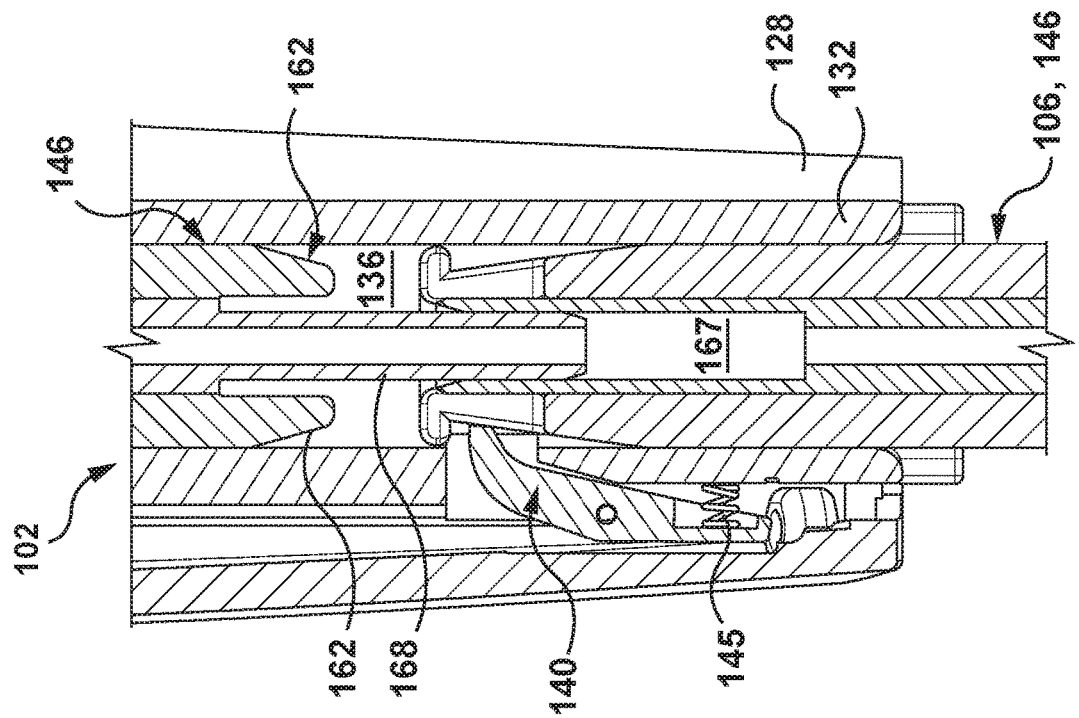

ADJUSTABLE HEIGHT PLYOMETRIC APPARATUS FOR VERTICAL JUMP EXERCISE OR TRAINING

FIELD OF THE INVENTION

The invention relates to a plyometric apparatus having an adjustable height platform for vertical jump exercise or training that is used to improve a user's vertical jumping height and/or physical fitness.

BACKGROUND OF THE INVENTION

Generally plyometrics are a variety of exercises that provide strength-training and may be utilized for improving or maintaining a user's health and fitness. "Jump training" refers to a certain type of plyometric exercises that can help in training for basketball, volleyball or any other activity that uses explosive movements. When participating in certain jump training, a user may utilize a set of boxes or platforms of different vertical heights. Thus the user will start by jumping onto a box, for instance, of a lower vertical height and after mastery of the lower height the user will move on to jumping onto a box of a greater vertical height. This process will continue as the user's jumping ability increases.

Known sets of jump boxes for plyometric exercises are commercially available in a series of fixed vertical heights. In some such sets, each jump box is rather cumbersome in size and the set requires a lot of storage space that is at a premium in most gyms, and/or training or therapy centers. In other such sets, the jump boxes or platforms may be stackable to at least alleviate some of the storage concerns. However, another deficiency of known sets of individual jump boxes is that the series of fixed vertical heights is limited by the number of jump boxes in the set, and very often small or slight incremental increases in vertical height between jump boxes in the set are not commercially feasible, or available, due to a limit on the number of such jump boxes any one establishment would be willing to keep on hand.

Other known jump boxes address the concerns of storage and incremental increases in height by providing limited adjustment in a vertical height of the platforms, such as via a pair of legs providing a scissor lift, individual legs with pin locks or telescoping legs with detents. However, such known jump boxes suffer from other short comings, such as difficulty of use and/or limitations on vertical heights that are achievable, particularly not accommodating desirable higher vertical heights for a user.

Embodiments hereof address one or more of the above-noted concerns of known jump boxes and provide an adjustable height plyometric apparatus that is easy to use and that provides a user with a variety of desirably higher vertical heights.

BRIEF SUMMARY OF THE INVENTION

Embodiments hereof are directed to an adjustable height plyometric apparatus that includes a platform component, a set of base leg components having elongate portions thereof disposed within the platform component, and a base component to which the set of base leg components are fixedly secured. In an embodiment, the platform component is configured to be simultaneously raised or lowered relative to the base leg components in an unlocked state and to be selectively secured thereon at any one of a selection of vertical heights in a locked state.

Embodiments hereof are also directed to an adjustable height plyometric apparatus including a platform component, a set of base leg components having elongate portions thereof disposed within the platform component, a base component to which the set of base leg components are fixedly secured, and one or more sets of upper leg components for attachment to the base leg components or another upper leg component. In an embodiment, the platform component is configured to be simultaneously raised or lowered relative to the base leg components in an unlocked state and to be selectively secured thereon at any one of a selection of vertical heights in a locked state. As well, the set(s) of upper leg components are attachable to the set of base leg components or another set of upper leg components for increasing the selection of vertical heights.

Other features of the foregoing will become apparent upon consideration of the detailed description.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 4 is an enlarged top perspective view of a platform substructure of the plyometric apparatus of FIGS. 1 and 2 in accordance with an embodiment hereof.

FIGS. 7A-7F depict an upper leg component for use with the plyometric apparatus of FIG. 1 in accordance with an embodiment hereof, with FIGS. 7A, 7B, 7C and 7D depicting various side views of the upper leg component and FIGS. 7E and 7F depicting various sectional views of the upper leg component.

FIGS. 8A-8E are side sectional views of a bottom portion of an upper leg component being coupled with a top portion of one of a base or other upper leg component in accordance with an embodiment hereof, wherein the leg components are depicted free of the remainder of the plyometric apparatus of FIG. 1 for illustrative purposes.

FIGS. 9A-9D are perspective views of a bottom portion of an upper leg component being coupled with a top portion of one of a base or other upper leg component in accordance with an embodiment hereof, wherein the leg components are depicted free of the remainder of the plyometric apparatus of FIG. 1 for illustrative purposes, wherein FIGS. 9A and 9B are sectional views.

FIGS. 10A-10E illustrate operation of a hard-stop mechanism of a platform component in accordance with an embodiment hereof and are side sectional views of a bottom portion of an upper leg component being coupled with a top portion of one of a base or other upper leg component.

DETAILED DESCRIPTION OF EMBODIMENTS OF THE INVENTION

Specific embodiments of the present invention are now described with reference to the figures, wherein like reference numbers indicate identical or functionally similar elements. The terms "top," "bottom," "upward," "downward," "raise," "lift," and "lower," and various forms thereof, are used in the following description with respect to a position or direction relative to an apparatus, component or element hereof during an intended or normal use thereof. The following detailed description is merely exemplary in nature and is not intended to limit the invention or the application and uses of the invention. Although the description of embodiments hereof are in the context of vertical jump training, the invention may also be used in any other training, recreational or therapeutic applications and for any other training, recreational or therapeutic purposes, such as a recreational pare course and/or physical therapy applications, where it is deemed useful. Furthermore, there is no intention to be bound by any expressed or implied theory presented in the preceding technical field, background, brief summary or the following detailed description.

Figure 1:
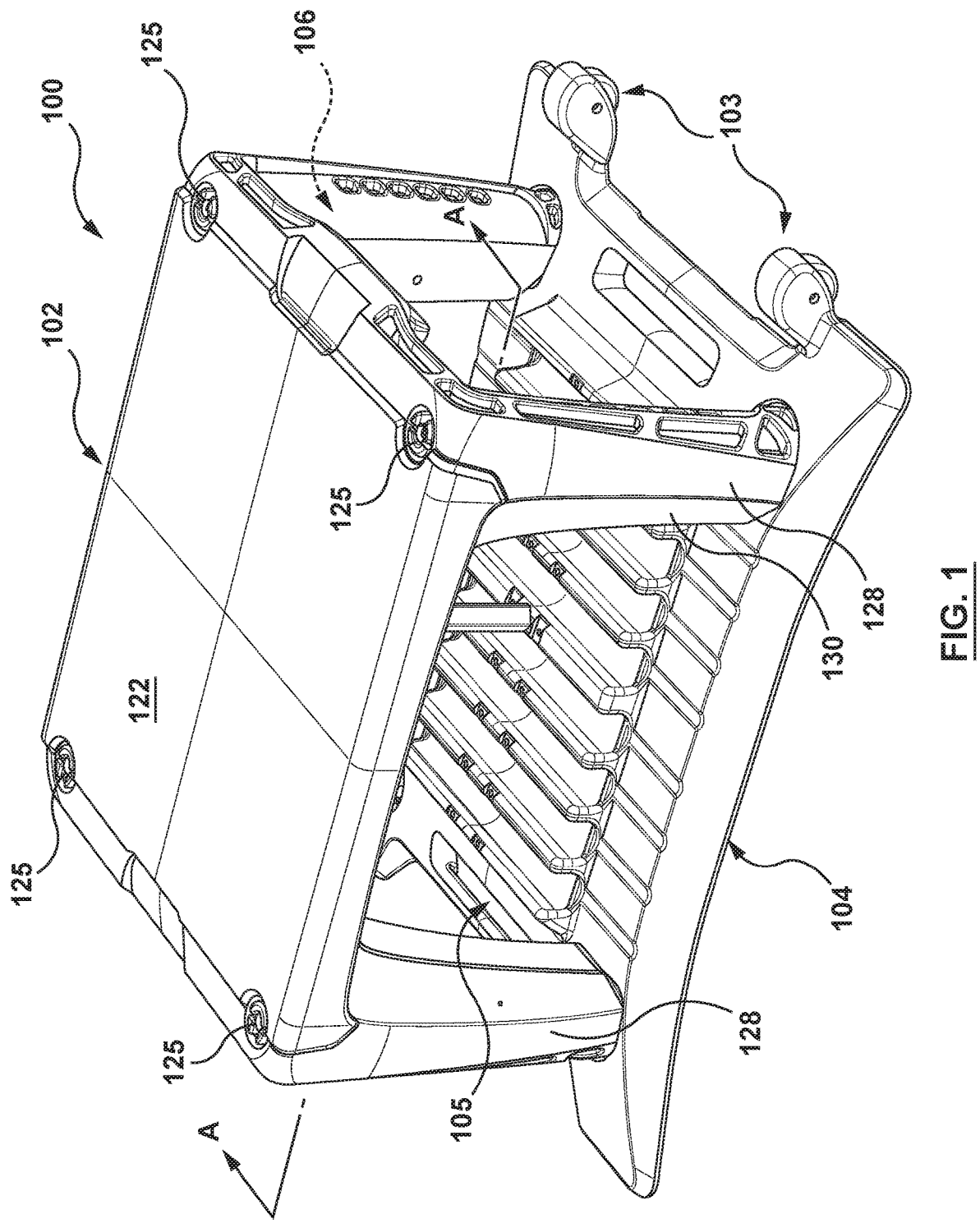
FIG. 1 is a perspective view of an adjustable height plyometric apparatus for vertical jump training in accordance with an embodiment hereof.
Figure 1A:
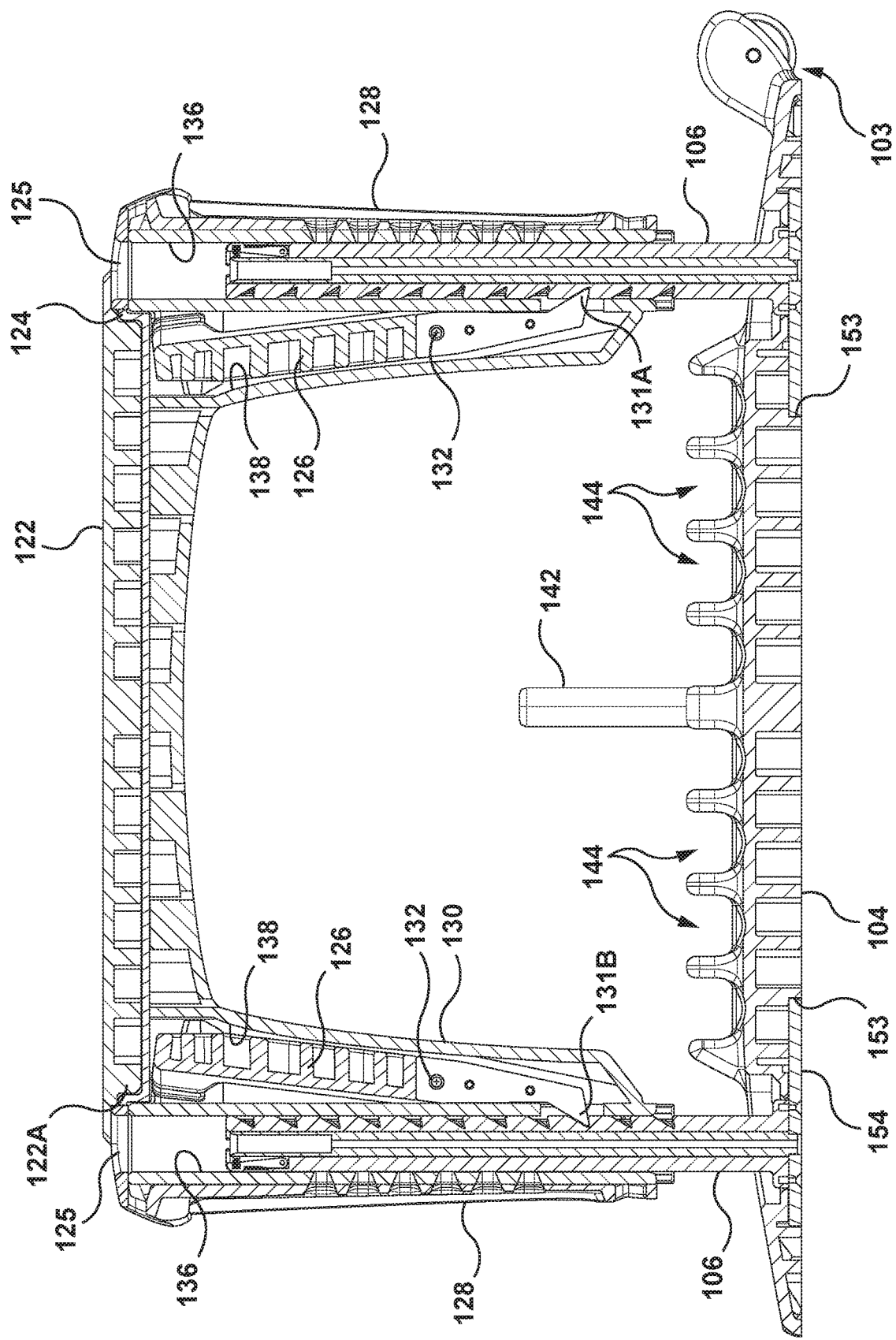
FIG. 1A is a sectional view of the plyometric apparatus of FIG. 1 taken along line A-A thereof with a platform component thereof in a locked state.
Figure 2:
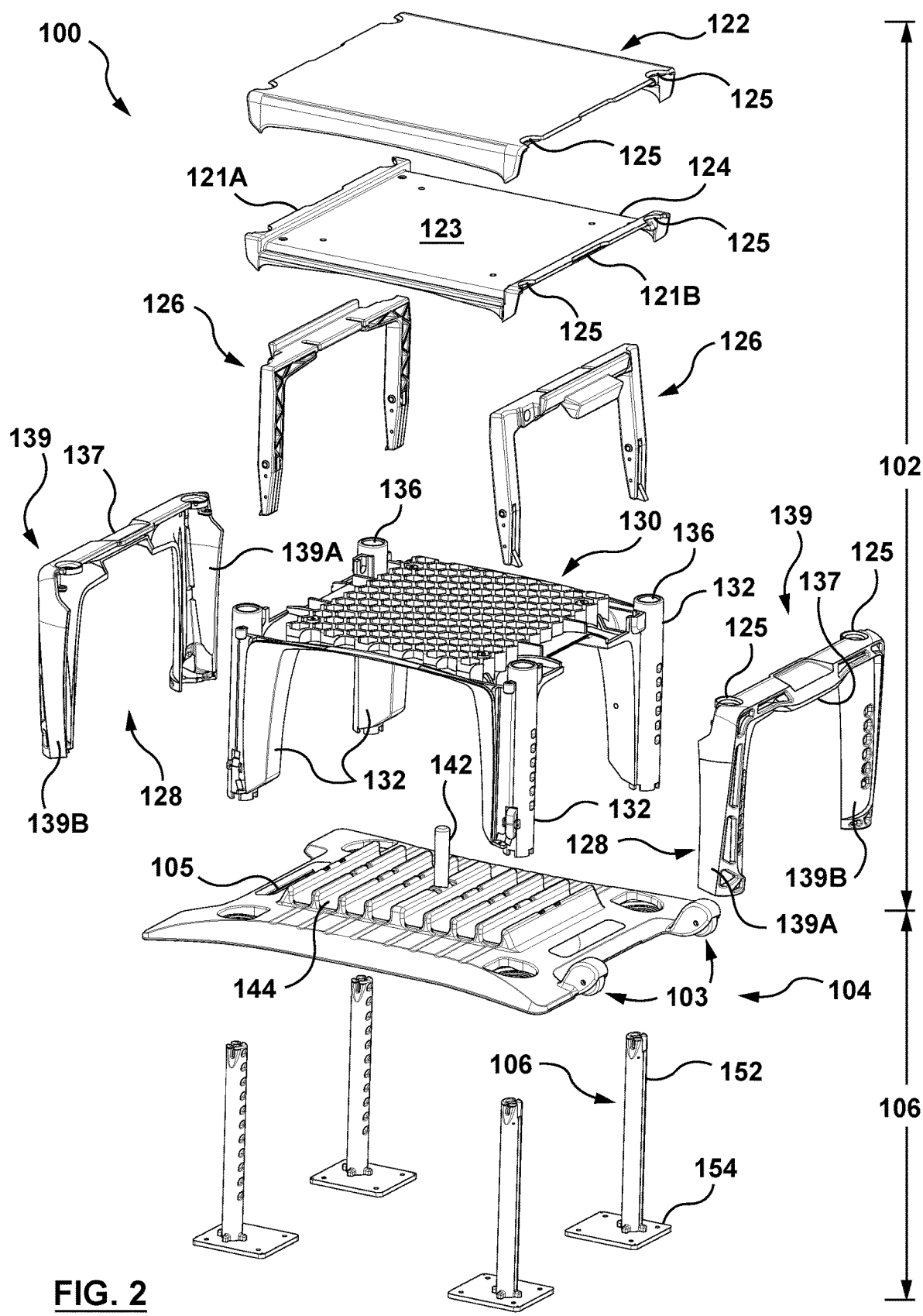
FIG. 2 is an exploded view of the plyometric apparatus of FIG. 1 showing various components and elements thereof in accordance with an embodiment hereof.

FIG. 1 is a perspective view of an adjustable height plyometric apparatus 100 for vertical jump training in accordance with an embodiment hereof, FIG. 1A is a sectional view of the plyometric apparatus 100 taken along line A-A of FIG. 1, and FIG. 2 is an exploded view of the plyometric apparatus 100 showing various components and elements thereof. In the embodiment depicted in FIGS. 1 and 2, the plyometric apparatus 100 includes a platform component 102, a base component 104 and a set of four fixed or base leg components 106. Generally, and as explained in detail herein, the platform component 102 of the plyometric apparatus 100 is configured to achieve a variety of vertical heights by being slid upwards or downwards on the set of base leg components 106 simultaneously, wherein the base leg components are fixedly mounted to the base component 104. Stated another way, the platform component 102 may be simultaneously raised or lowered relative to the base leg components 106 and selectively locked thereon at any one of a selection or series of vertical heights, as explained in detail herein.

The platform component 102 is composed of multiple structural foam and injection molded structures that attach together to comprise the mechanical structure, mechanism mounting features, aesthetic coverings, padding, and leg component sleeves. In the illustrated embodiment, the platform component 102 includes a landing surface element 122, a landing surface support 124, a pair of spring-loaded locking (pawl) devices 126, a pair of handle elements 128 and a platform substructure 130. The landing surface element 122 forms a portion of a top surface of the platform component 102 and may be formed of a padding material to provide a cushioning or dampening surface for a user. As well the landing surface element 122 may be formed to provide an aesthetically pleasing appearance. In an embodiment, the landing surface element 122 may be an elastomeric material, like rubber/silicone/etc., that is formed by injection or compression molding. The landing surface support 124 is a stiff component that serves as a support for the landing surface element 122. The landing surface support 124 has a recessed planar portion 123 that extends between end portions 121A, 121B, which in conjunction with landing surface element 122 and handle elements 128 define leg receiving openings 125. The landing surface element 122 is sized and configured to substantially cover the landing surface support 124, and includes a downward abutment 122A that sits within the recessed planar portion 123. In an embodiment, the landing surface element 122 may be padding having a nominal thickness of between 0.75 and 1 inch, and may be wrapped about front to back surfaces of the landing surface support 124. In an embodiment, the landing surface element 122 may be padding made of thick molded foam or honeycombed thin rubber or other thermoplastic elastomeric material, and may be molded in a multitude of durometers for different applications. In an embodiment, the landing surface support 122 may be an elastomeric material, like rubber/silicone/etc., that is formed by injection or compression molding. In an embodiment, the landing surface support 122 may be over-molded onto the landing surface support 124.

Figure 1B:
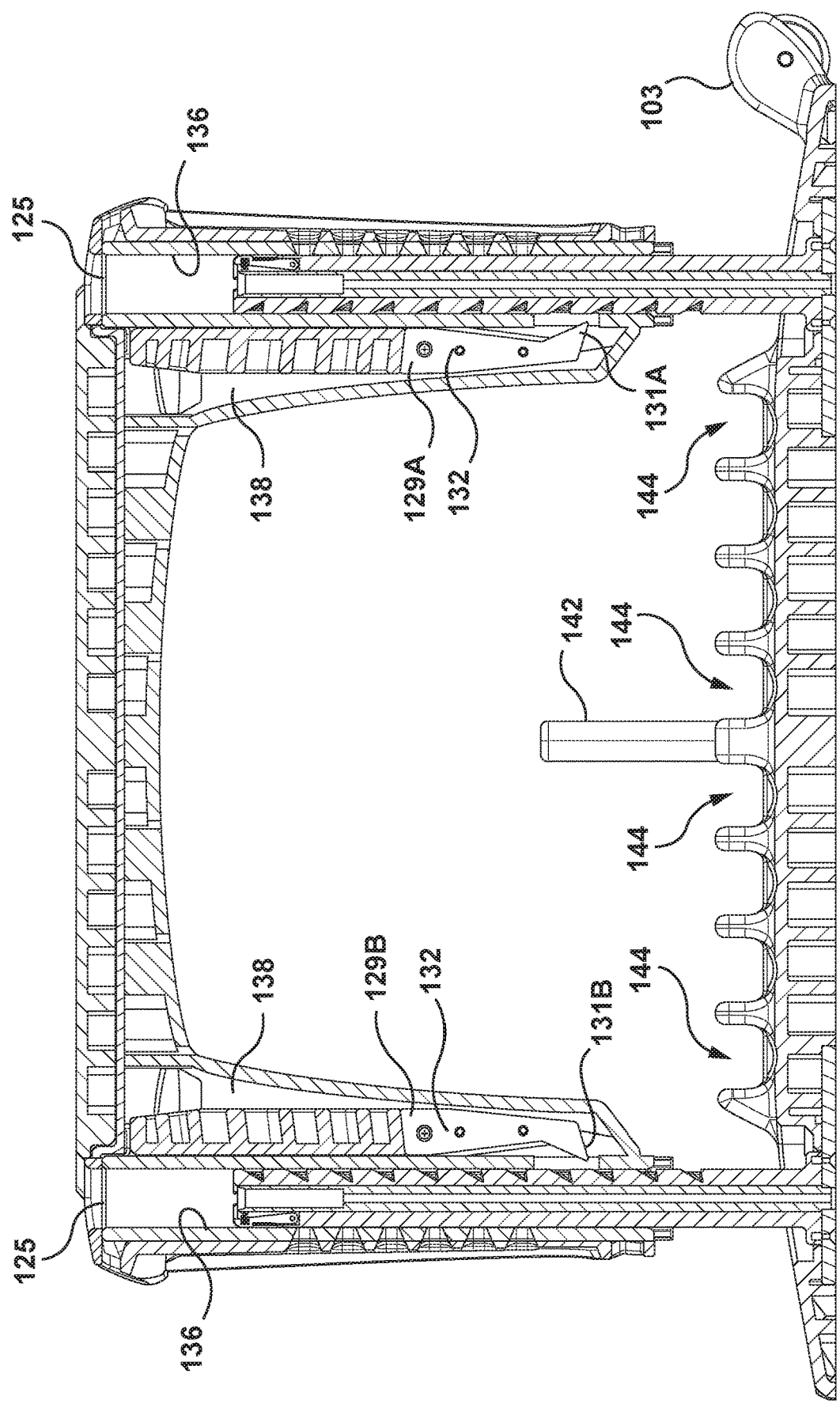
FIG. 1B is a sectional view of the plyometric apparatus of FIG. 1 taken along line A-A thereof with a platform component thereof in an unlocked state.
Figure 3:
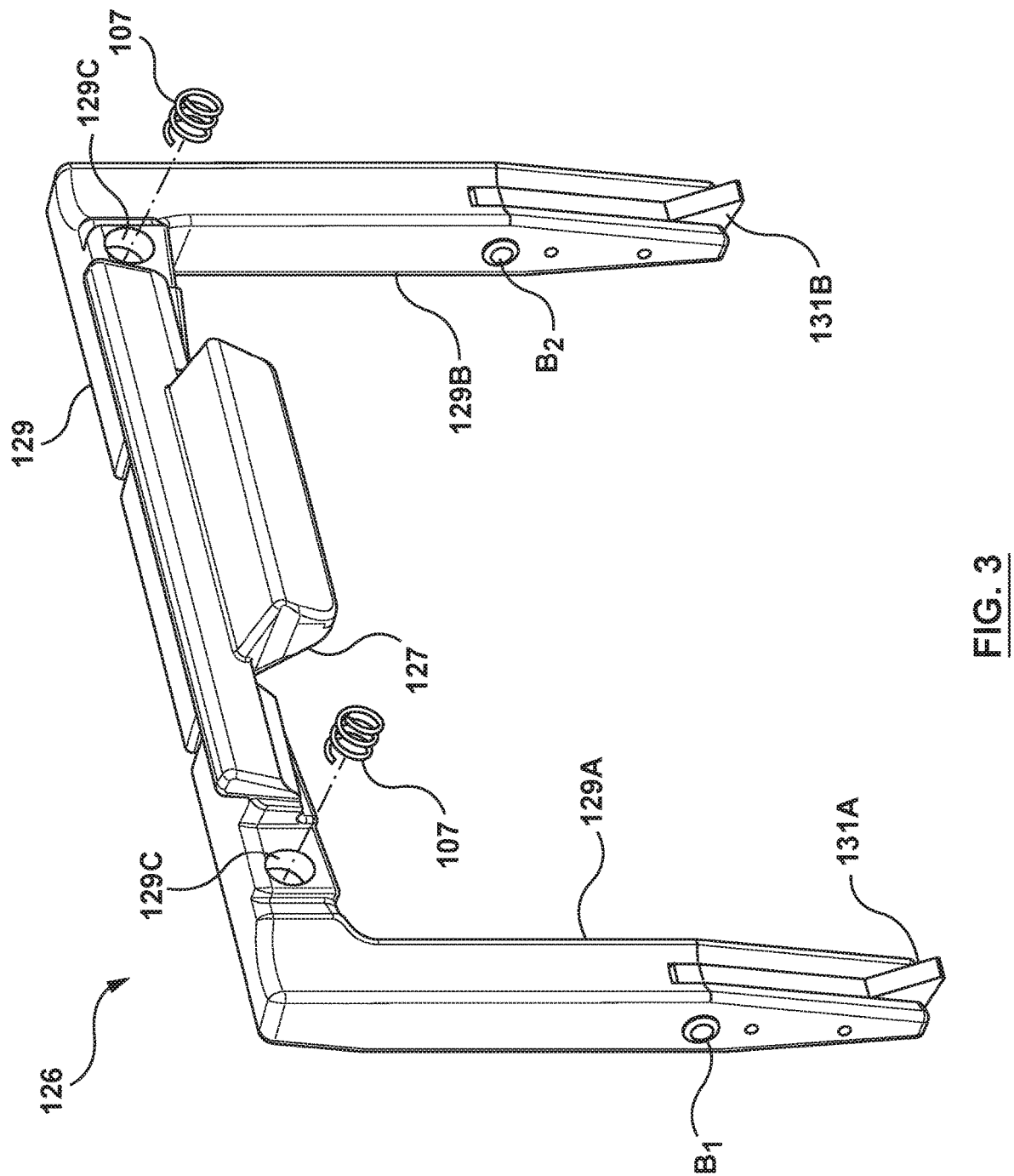
FIG. 3 is an enlarged side view of one of a pair of spring-loaded locking devices of the plyometric apparatus of FIGS. 1 and 2 in accordance with an embodiment hereof.
Figure 5A:
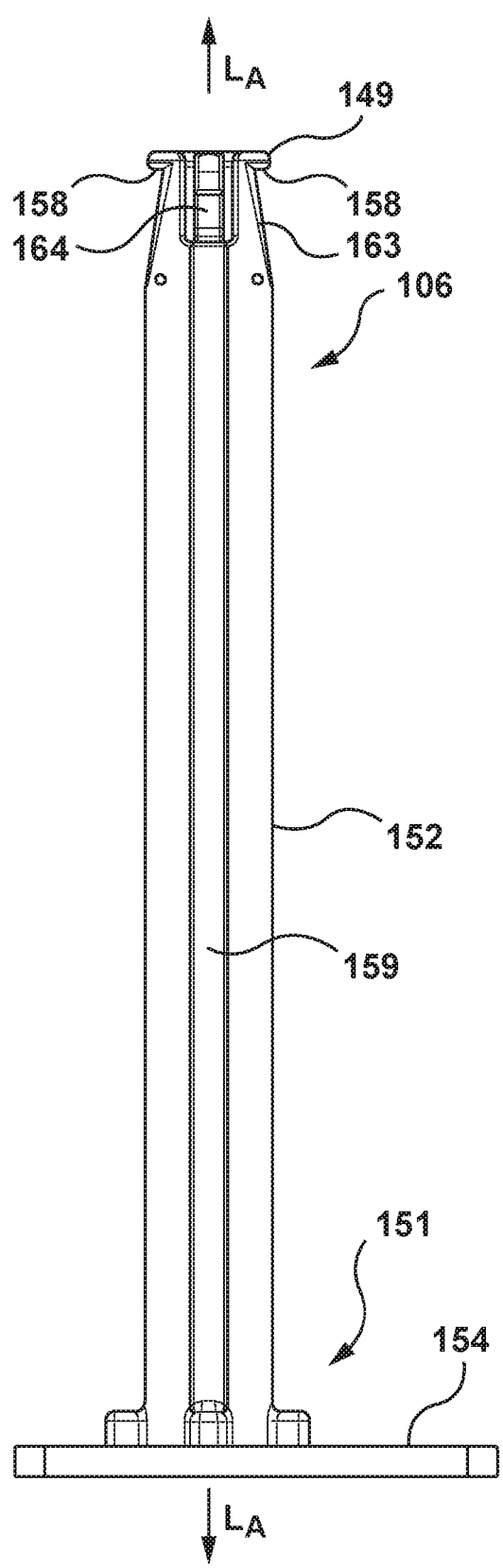
FIGS. 5A-5D depict a base leg component of the plyometric apparatus of FIGS. 1 and 2 in accordance with an embodiment hereof, with FIGS. 5A and 5B depicting various side views of the base leg component and FIGS. 5C and 5D depicting various sectional views of the base leg component.
Figure 5B:
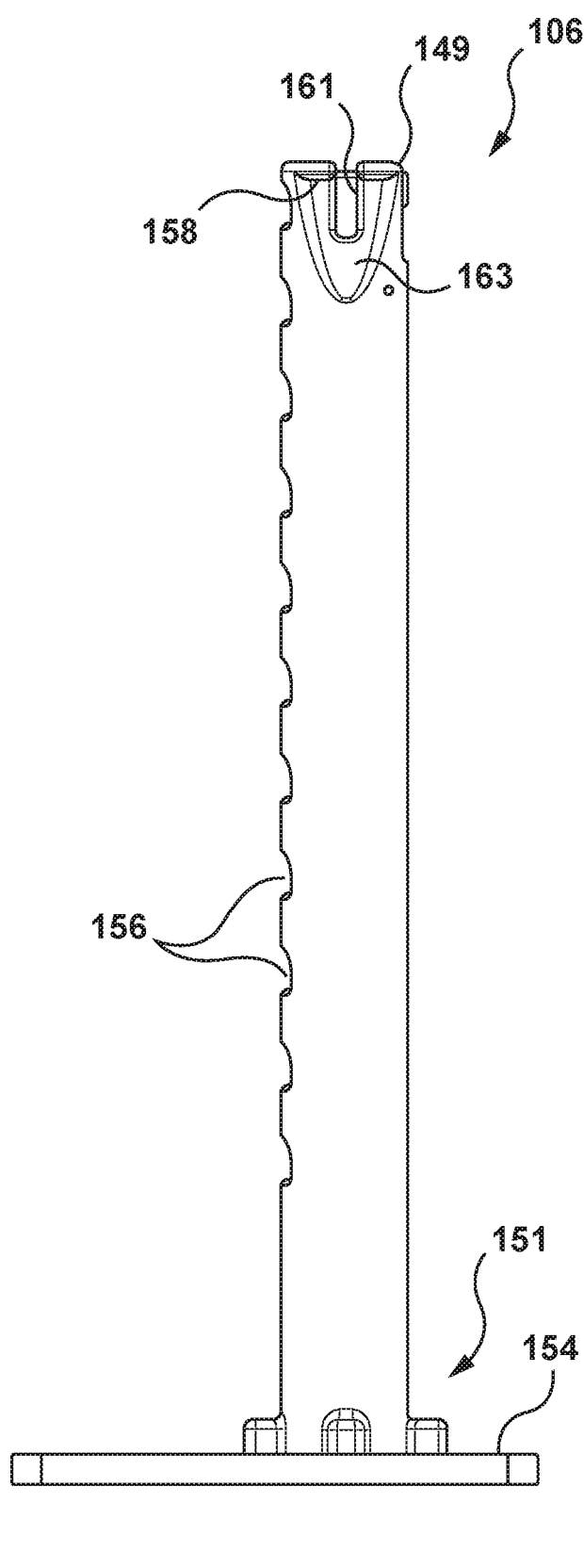
Figure 5C:
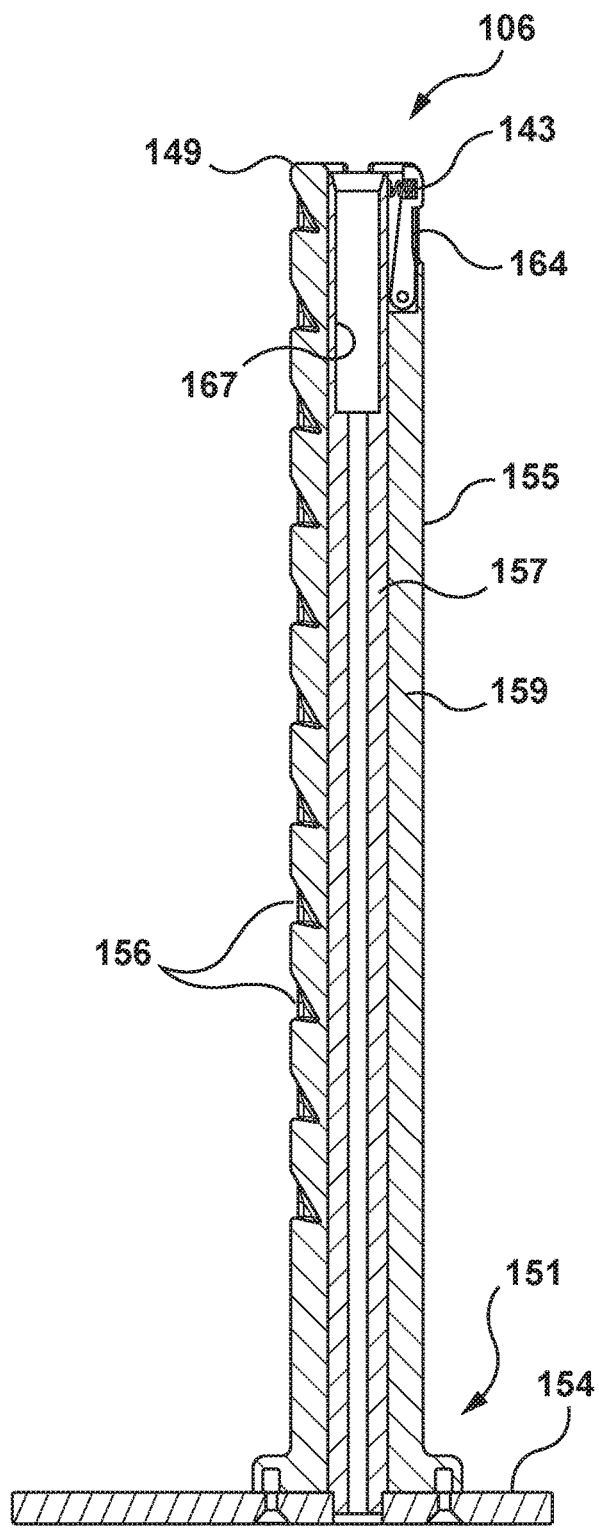
Figure 5D:
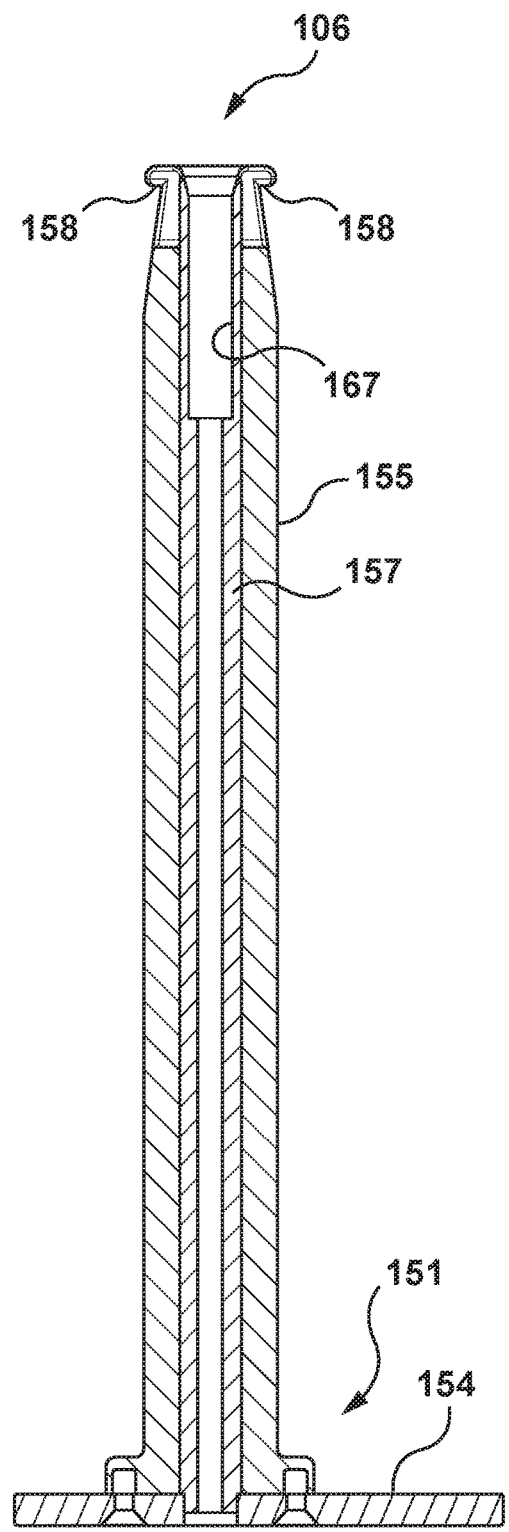
Figure 6:
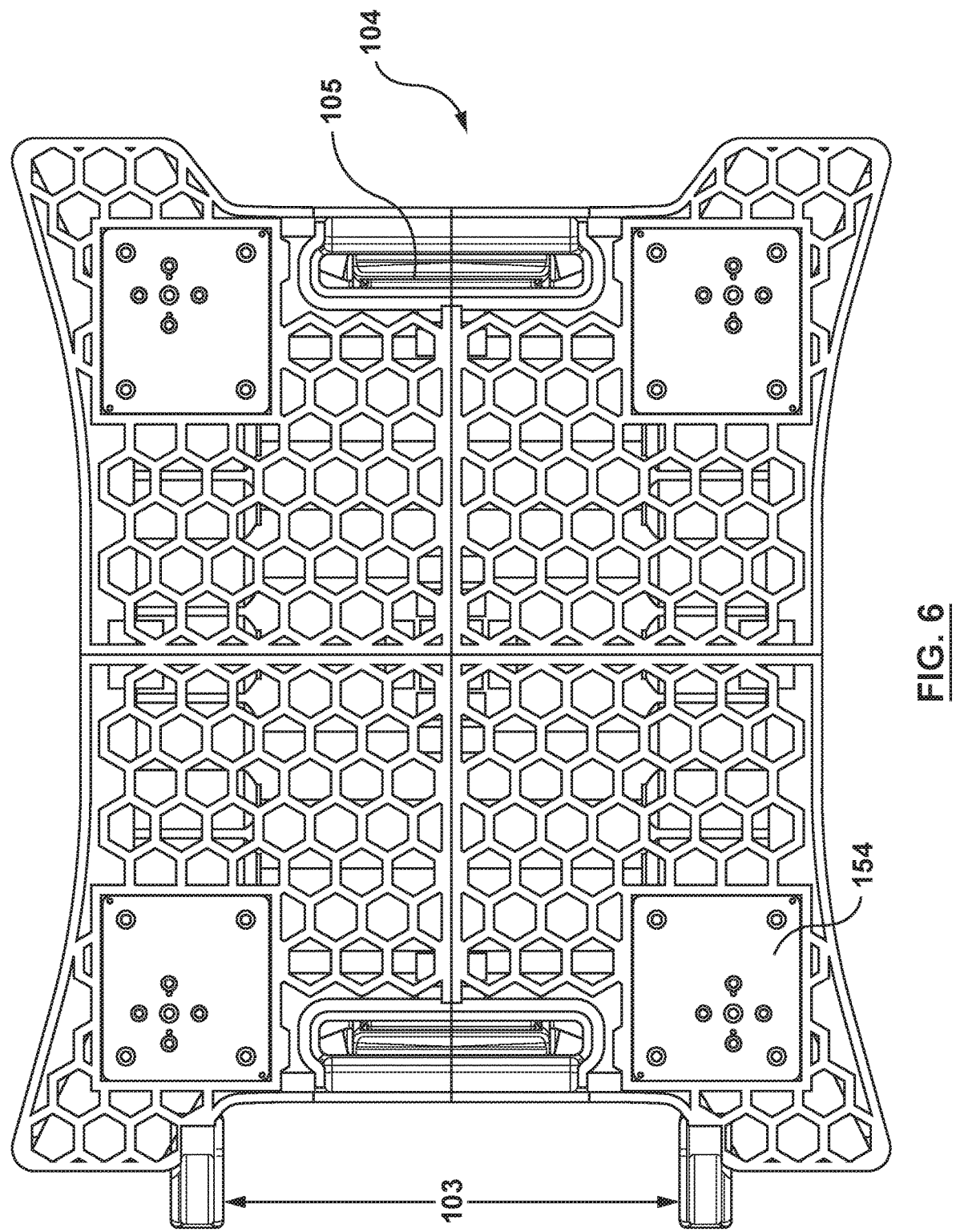
FIG. 6 is a bottom view of a base component of the plyometric apparatus of FIG. 1 in accordance with an embodiment hereof.
Figures 7A, 7B, 7C:
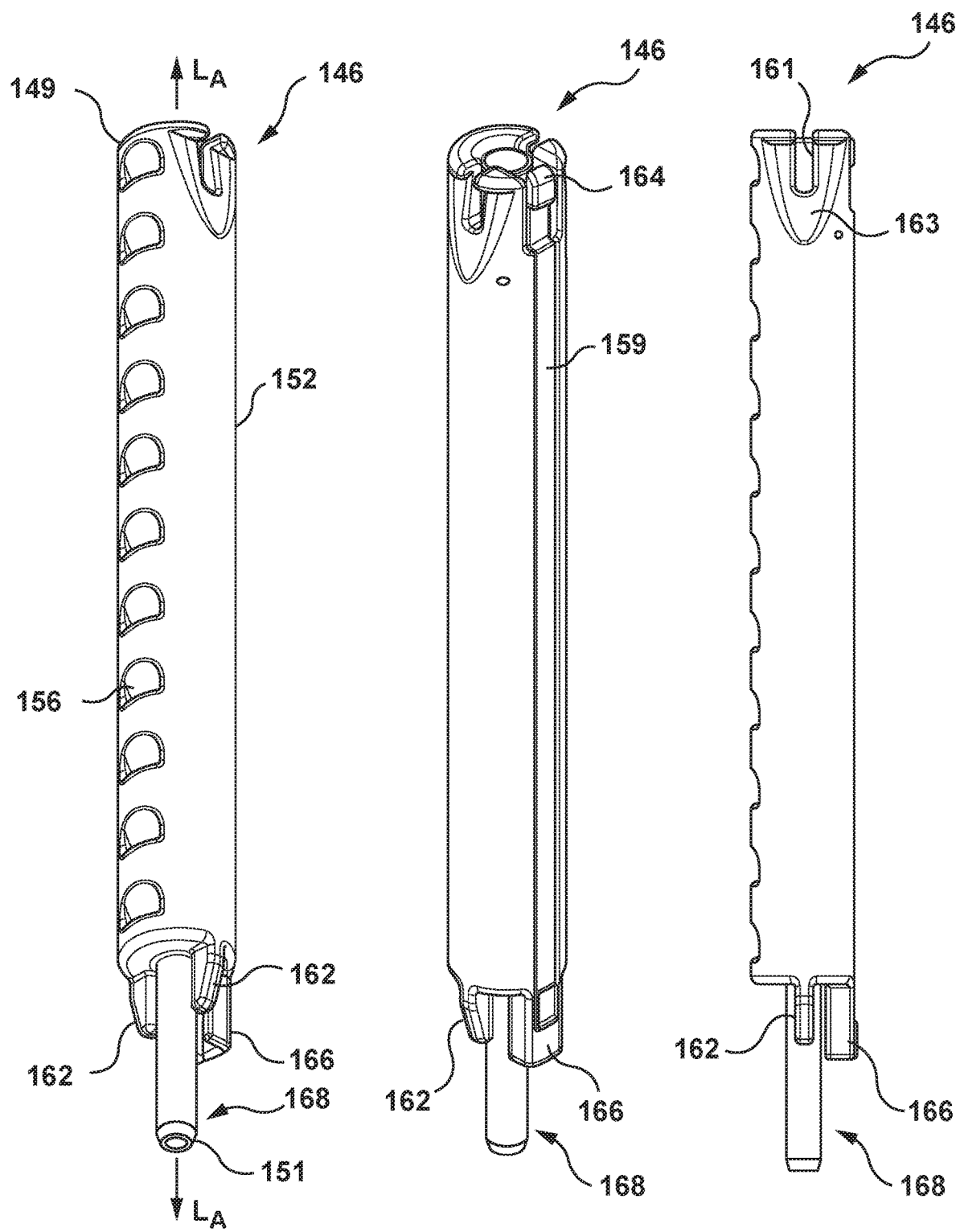

An enlarged view of one of the pair of spring-loaded locking (pawl) devices 126 is shown in FIG. 3. Each locking device 126 includes a spring-loaded graspable lever 127 and a substantially U-shaped frame 129 having a first extension 129A with a first pawl or locking portion 131A and a second extension 129B with a second pawl or locking portion 131B. The first extension 129A includes two bores 129C configured to receive respective springs 107. Each of the first and second extensions 129A, 129B includes a bore B1, B2 for receiving a respective pivot pin or shaft 132 (as shown in FIGS. 1A and 1B) for being pivotably coupled to a respective leg segment 132 of the platform substructure 130. As explained in more detail herein, when a user grasps the pair of spring-loaded locking (pawl) devices 126 the respective first and second extensions 129A, 129B and thus the first and second locking portions 131A, 131B pivot away from its corresponding leg component (and more particularly the respective notch 156 therein), such as a respective base leg component 106, in order to unlock the platform component 102 therefrom (as shown in FIG. 1B) and to thereby permit vertical movement of the platform component 102 relative to the base component 104 in either of an upward or downward direction. Stated another way, when actuated to be in the described unlocked state the platform component 102 may be raised and lowered relative to the set of base leg components 106. Release of the spring-loaded graspable lever 127 returns the locking devices 126 to their locked state with the locking portions 131A, 131B seated within respective slots of respective leg components, such as base leg components 106, as shown in FIG. 1A, to secure a respective vertical height. A spring 107 of the spring-loaded locking (pawl) device 126 may be any one of a compression, extension or torsion spring that is configured to bias the graspable lever 127 in its locked state, as shown in FIG. 1A.

The platform substructure 130 is shown in a perspective view in FIG. 4. The platform substructure 130 includes four leg segments 132 and a planar segment 134 that extends therebetween. In the embodiment shown in FIG. 4, the planar segment 134 is comprised of a honeycomb or cellular matrix in order to provide the planar segment 134 with stability and sufficient tensile and torsional strength to accommodate jump training. Each of the leg segments 132 has a through channel 136 formed therein, with open top and bottom ends. Each channel 136 is sized to slidably receive a leg component therein, such as a respective base leg component 106. Each channel 136 also align with a respective leg receiving opening 125, with each leg receiving opening 125 being defined by the combination of the landing surface element 122, the landing surface support 124 and one of the pair of handle elements 128 (as previously noted above). Adjacent to each leg segment 132 the platform substructure 130 defines a hollow chamber 138 for receiving a respective first or second extension 129A, 129B of a locking device 126. The hollow chamber 138 is sized and configured to permit operational pivoting of the locking device 126, and particularly the respective first and second extensions 129A, 129B, between the locked state shown in FIG. 1A and the unlocked state shown in FIG. 1B, and vice versa. In an embodiment, the platform substructure 130 may be a polymer resin, such as polypropylene or nylon, that is formable into a rigid, tough plastic with the shape/structure being formed by one of injection molding, structural foam molding, or casting.

In embodiments hereof, the platform substructure 130 also includes one or more hard-stop mechanisms 140 operationally attached and disposed at a bottom end of one or more respective leg segments 132. Each of the hard-stop mechanisms 140 is configured to engage with a stop or flange 158 located at a top end of a respective leg component 106, 146 to prevent a user from lifting the platform component 102 off of, or clear of, the leg components, such as base leg components 106 or a set of upper leg components 146, as explained in more detail below with reference to FIGS. 10A-10E. In embodiments hereof, fewer than four hard-stop mechanisms 140 may be utilized, such as one, two or three.

With reference to FIG. 2, the pair of handle elements 128 of the platform component 102 is disposed to provide an exterior covering for the leg segments 132 of the platform substructure 130. Each handle element 128 has a substantially U-shaped frame 139 having a first extension 139A and a second extension 139B. The first and second extensions 139A, 139B have substantially semi-cylindrical forms to correspondingly cover respective leg segments 132 of the platform substructure 130 and their associated hard-stop mechanisms 140. As well the handle elements 128 may be formed to provide an aesthetically pleasing appearance. Each handle element 128 includes an integrally formed handle portion 137 that is disposed to be in opposition with a respective spring-loaded graspable lever 127 to aid a user in actuating the lever 127 by proving an upper bearing surface. As previously noted above, each handle element 128 defines at least a portion of a pair of leg receiving openings 125 that align with respective through channels 136 of the leg segments 132 of platform substructure 130. In an embodiment, each handle element 128 may be one of a thermoplastic polymer, such as acrylonitrile butadiene styrene (ABS), polypropylene or glass-filled nylon, and a structural foam/resin, and is formed by metal casting/stamping.

Although the platform component 102 has been described above as having each of the landing surface element 122, the landing surface support 124, the pair of spring-loaded locking (pawl) devices 126, the pair of handle elements 128 and the platform substructure 130 as separate components or features, other constructions, combinations and/or arrangement of parts may be resorted to without departing from the spirit and scope of the invention. For instance, one or more of the various elements, support, devices and/or substructure may be combined or eliminated, and various features thereof may be combined or eliminated, as various changes may be made in the form, construction and arrangement of the parts herein without departing from the spirit and scope of the invention.

Figure 1C:
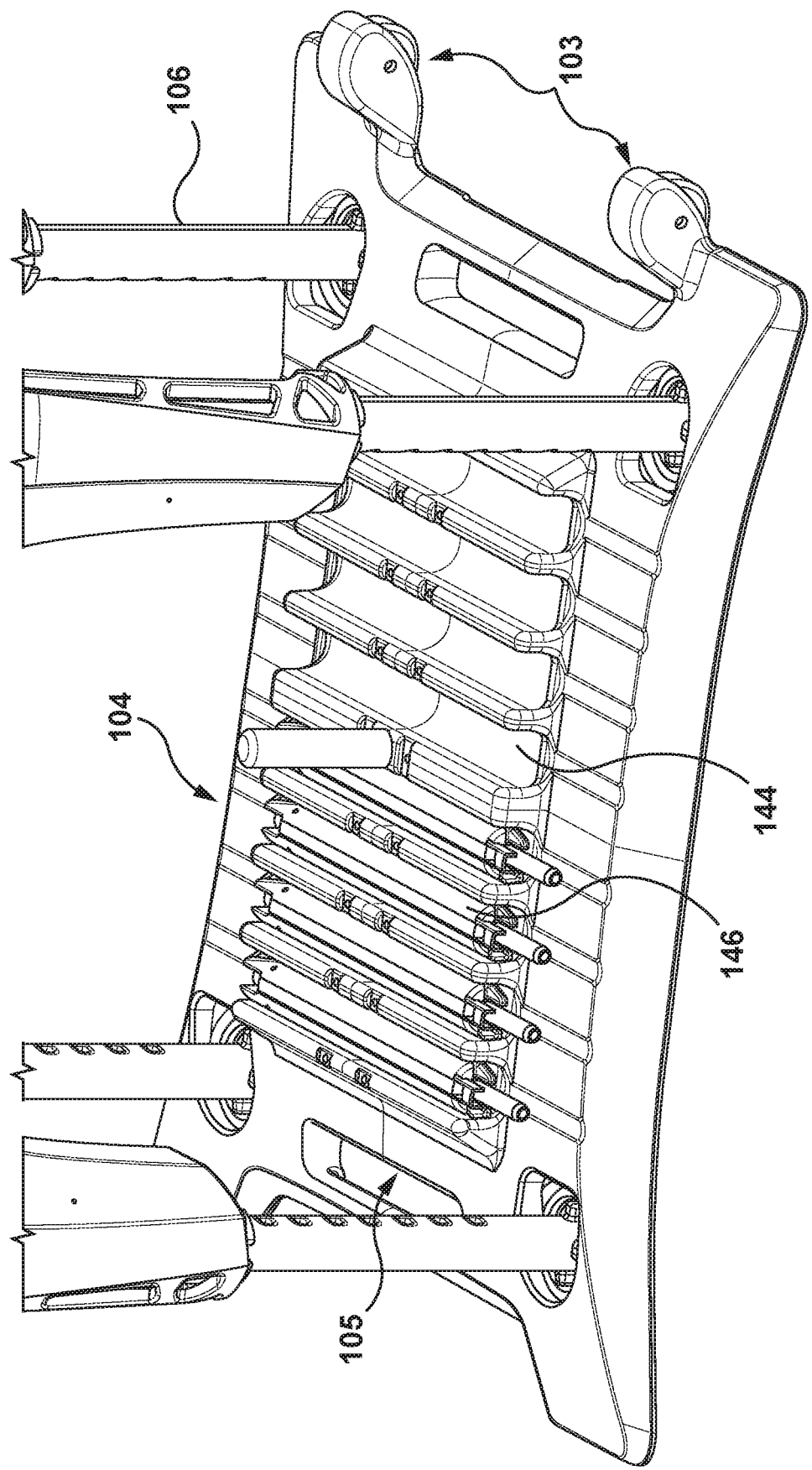
FIG. 1C is an enlarged top view of a base component of the plyometric apparatus of FIG. 1 with a set of upper leg components secured therein in accordance with an embodiment hereof.

The base component 104 and the fixed or base leg components 106 are now described with reference to FIGS. 1, 1A, 1B, 2, 5A-5D and 6. The base component 104 provides a foundational support for the platform component 102 and the base leg components 106 and is a substantially planar structure that is configured and dimensioned so as to provide sufficient stability, and tensile and torsional strength to accommodate jump training. In embodiments hereof, the base component 104 increases a footprint of the plyometric apparatus 100 to reduce the chance of tipping over during use. In an embodiment, the base component 104 includes a weight attachment 142 in the form of a vertical cylindrical extension, tube or pole substantially centered thereon for receiving one or more free weights, such as standard gym weights, for added mass to aid in anchoring/stabilizing the plyometric apparatus 100. The weight attachment 142 is by way of example and not limitation and other weight attachments, such as one that would accommodate a kettle bell weight, may be used without departing from the scope hereof. In an embodiment the base component 104 also includes a plurality of horizontal storage bays 144 for storing additional leg components 146, as shown in FIG. 1C. Each storage bay 144 is a semi-cylindrical trough that is sized and configured to receive a respective upper leg component 146 (as shown in FIGS. 7A-7F) in an interference fit relationship, such that the upper leg components may be secured therein when not in use. Optionally, in order to provide the plyometric apparatus 100 with ready mobility, the base component 104 incorporates a pair of shrouded wheels 103 on one side, and an integrated handle 105 on the opposing side, for easy transport. In an embodiment, the base component 104 may be a metal or a thermoplastic polymer, such as acrylonitrile butadiene styrene (ABS), polypropylene or nylon, which is formable into a rigid, tough plastic, with the shape/structure being formed by injection molding, structural foam molding, casting, or metal weldment].

Each base leg component 106 includes an elongate portion or leg element 152 attached at a bottom end 151 to a coupling plate 154. The coupling plate 154 is configured to be mounted or attached to the base component 104 in any suitable fashion with the leg element 152 projecting upwards from the base component 104, as shown in the figures. In an embodiment, the base component 104 is formed to have corresponding recesses 153 in the bottom surface for receiving the respective coupling plates 154 in a flush mount relationship.

In an embodiment, each base leg component 106 includes a longitudinally-extending rack or series of notches 156 on the leg element 152 that are configured to receive a respective locking portion or pawl 131A, 131B of a respective locking device 126 when the device is in its locked state, as shown in FIG. 1A. Stated another way, each base leg component 106 may be described as including a plurality of notches 156 that are evenly spaced along a length or a longitudinal axis $L_A$ of the base leg component 106. Each base leg component 106 may also include a longitudinally-extending slot 159 in an outer surface of the leg element 152 that is disposed 180 degrees from the rack of notches 156, with the slot 159 providing radial location when an optional keying feature is used at leg receiving openings 125. In another embodiment, the slot 159 may be used as an indentation in which to apply a label denoting height increments. In an embodiment shown best in FIG. 5C, which is a sectional view of a base leg component 106, the base leg component 106 may be a composite structure with a thick-walled outer layer 155, within which the rack of notches 156 and slot 157 are formed, and a tubular insert 157 for added strength. In an embodiment, the outer layer 155 may be of structural foam, such as foamed polypropylene, and the tubular insert 157 may be of a suitable metal, such as stainless steel or aluminum, or thermoplastic polymer, such as acrylonitrile butadiene styrene (ABS), polypropylene or glass-filled nylon. In an embodiment, a structural foam outer layer 155 may be over-molded onto the tubular insert 157, or may be installed using mechanical attachment like a fastener or pin, or thermal shrink fit. In another embodiment, a base leg component 125 may be formed entirely from a suitable metal, by a casting and/or hydroforming process.

Figures 8A, 8B, 8C:
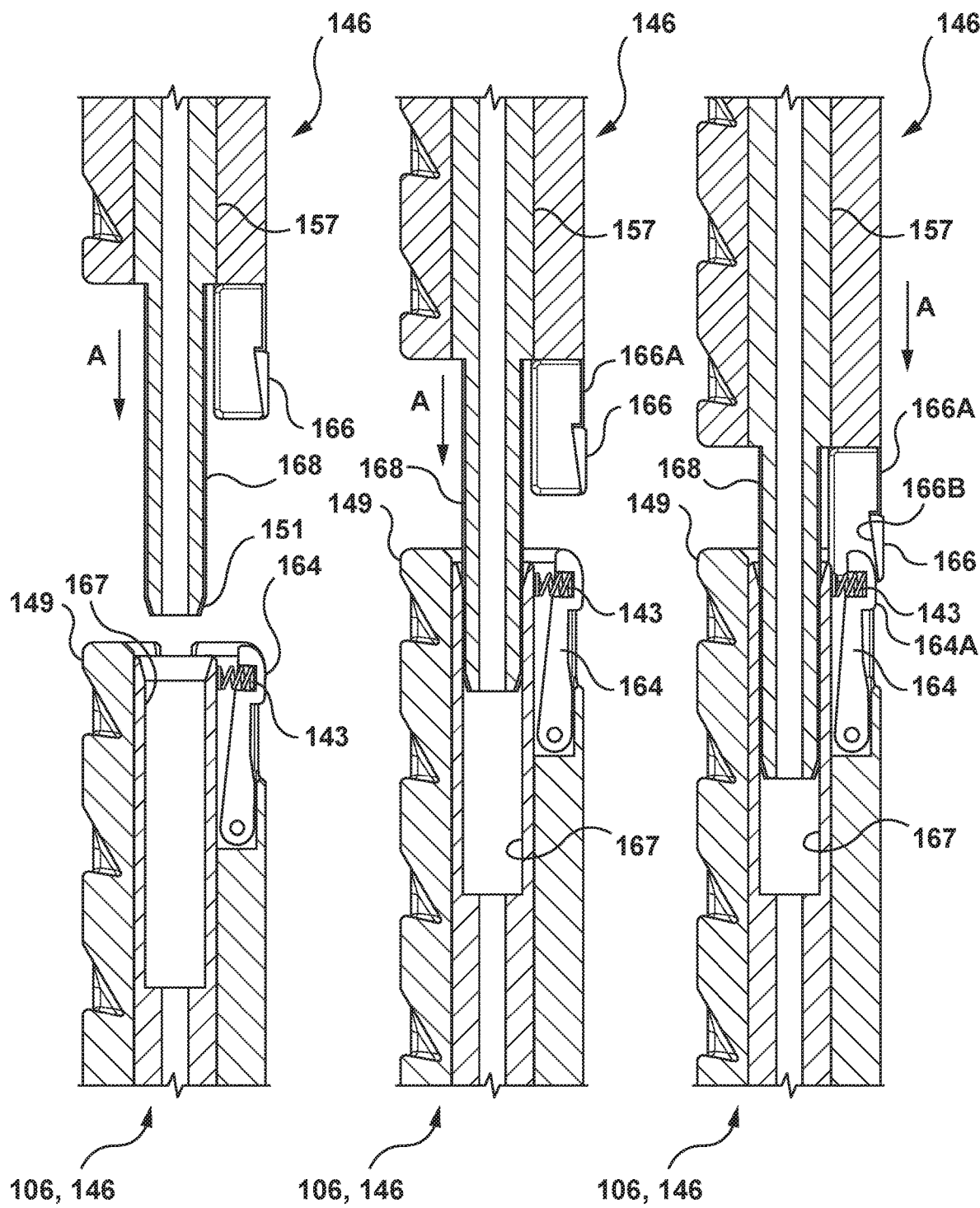

A pair of flanges 158 that are configured to be engaged by the hard-stop mechanisms 140 are located on a top end 149 of each leg component 106. The flanges 158 are disposed 180 degrees from each other, and 90 degrees respectively from the rack of notches 156. In an embodiment, flanges 158 are integral with, and formed during molding of, the outer layer 155. Each flange 158 caps, or frames the top of, a depression 163 and is split by a keyhole 161, with the keyhole 161 being of a corresponding geometry for receiving a ramped (downwardly tapered) boss 162 of an upper leg component 146. Spring-biased leg locks 164 are operably disposed at the top end 149 of each leg component 106 and are configured to engage with a corresponding lock segment 166 of an upper leg component 146, as described below. A spring 143 of the spring-biased leg locks 164 (as shown in FIGS. 5C, 7E, 8A-8E, 9A and 9B) may be any one of a compression, extension or torsion spring that is configured to bias the lock 127 in its locked state, as shown in FIGS. 8E and 9A.

In accordance with embodiments hereof, the plyometric apparatus 100 of FIG. 1 may also include one or more additional sets of upper leg components 146 in order to provide additional vertical heights for the platform component 102. The upper leg components 146 are configured to be inserted into the platform component 102 from the top surface, thereby easily increasing the usable height of the apparatus. Each upper leg component 146 may have the following structure in order to be easily and safely attached with either of a respective base leg component 106 (described above) or another upper leg component 146. Like reference numbers are used to describe similar features the upper leg components 146 share with the base leg components 106.

Each upper leg component 146 includes an elongate leg element 152 that includes a longitudinally-extending rack of notches 156 that are configured to receive a respective locking portion or pawl 131A, 131B of a respective locking device 126 when the plyometric apparatus 100 is in a locked state, in the same manner as shown for the base leg components 106 shown in FIG. 1A. Stated another way, each upper leg component 146 may be described as including a plurality of notches 156 that are evenly spaced along a length or a longitudinal axis $L_A$ of the upper leg component 146. Each upper leg component 146 may also include a longitudinally-extending slot 159 in an outer surface thereof that is disposed 180 degrees from the rack of notches 156, with the slot 159 providing radial location. In an embodiment shown best in FIGS. 7E and 7F, which is a sectional view of an upper leg component 146, the upper leg component 146 may be a composite structure with a thick-walled outer layer 155, within which the rack of notches 156 and slot 157 are formed, and a tubular insert 157 for added strength. In the upper leg components 146 a lower or bottom segment of the outer layer 155 forms the opposing pair of ramped boss 162 and the lock segment 166, whereas a lower or bottom segment of the tubular insert 157 extends below the outer layer 155 to form a projection 168. The projections 168 of the upper leg components 146 are sized and configured to be slidably received within a corresponding bore or aperture 167 within a top end 149 of another upper leg component 146 or a respective base leg component 106. In an embodiment, the outer layer 155 may be of structural foam, and the tubular insert 157 may be of a suitable metal or polymer as described above for the base leg component 125. as well, an upper leg component 146 may be formed by any of the materials and methods noted above for a base leg component 106.

A pair of flanges 158 that are configured to be engaged by the hard-stop mechanisms 140 are located on a top end 149 of each leg component 146. The flanges 158 are disposed 180 degrees from each other, and 90 degrees respectively from the rack of notches 156. In an embodiment, the flanges 158 are integral with, and formed during molding of, the outer layer 155]. Each flange 158 caps, or frames the top of, a depression 163 and is split by a keyhole 161, with the keyhole 161 being of a corresponding geometry for receiving a ramped (downwardly tapered) boss 162 of another upper leg component 146. A spring-biased leg lock 164 is operably disposed at a top end 149 of each upper leg component 146 and is configured to engage with a corresponding lock segment 166 at a bottom end 151 of another upper leg component 146. As discussed above, a spring 143 of the spring-biased leg locks 164 (as shown in FIGS. 5C, 7E, 8A-8E, 9A and 9B) may be any one of a compression, extension or torsion spring that is configured to bias the lock 127 in its locked state, as shown in FIGS. 8E and 9A.

In an embodiment, each of the base leg components 106 have a single leg geometry and each of the upper leg components 146 have a single leg geometry, i.e., each has the same geometry of other like legs, such that the respective leg components may be interchangeably used at any of the four corners of the apparatus.

Figure 11:
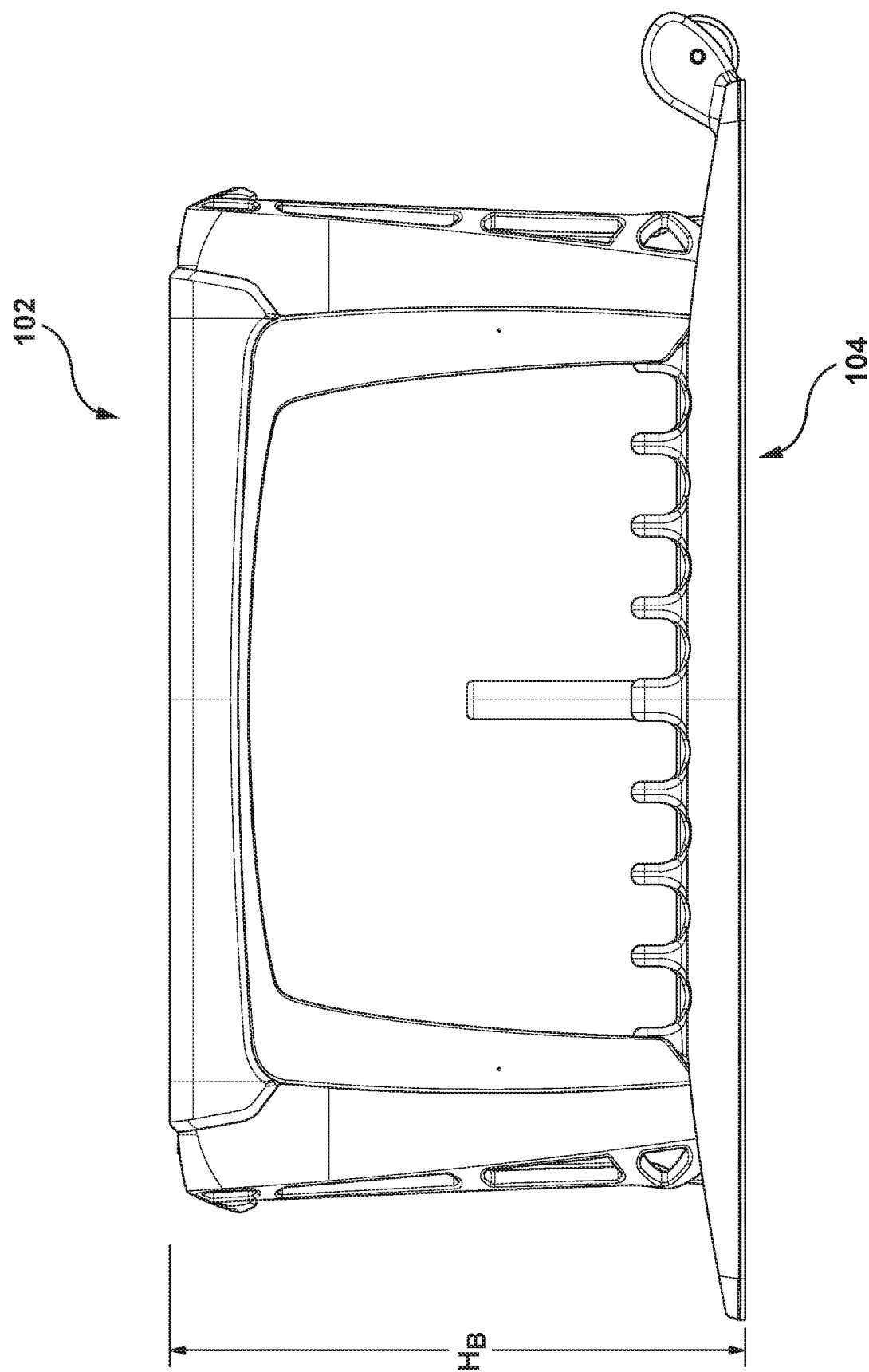
FIG. 11 is a side view of the adjustable height plyometric apparatus of FIG. 1 depicted at a minimum or base height in accordance with an embodiment hereof.
Figure 12:
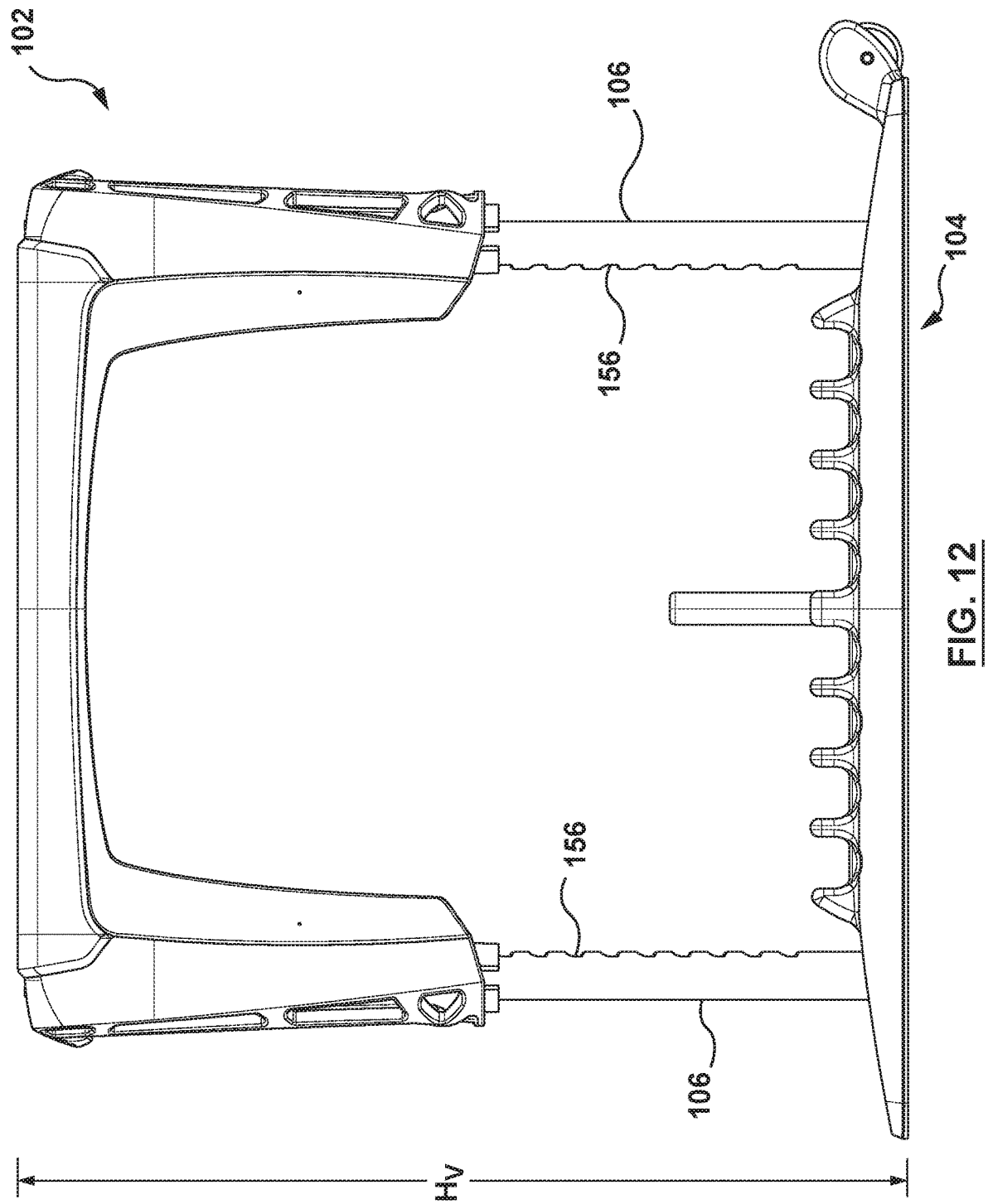
FIG. 12 is a side view of the adjustable height plyometric apparatus of FIG. 1 depicted at one of a vertical height attainable by the apparatus in accordance with an embodiment hereof.
Figure 13:
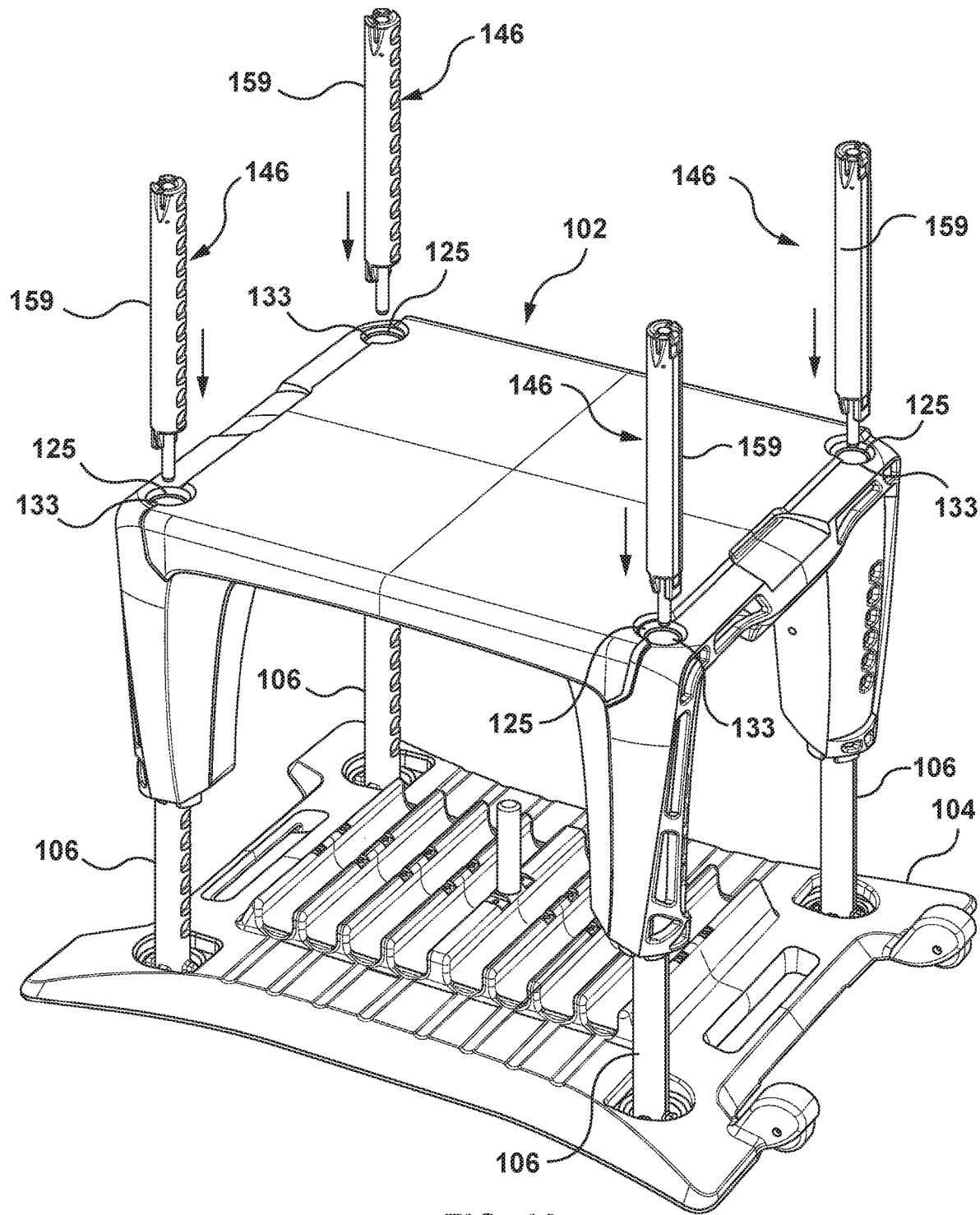
FIG. 13 illustrates a first set of upper leg components being aligned with and inserted within respective leg receiving openings of a platform component of the adjustable height plyometric apparatus of FIG. 1 in accordance with an embodiment hereof.
Figure 14:
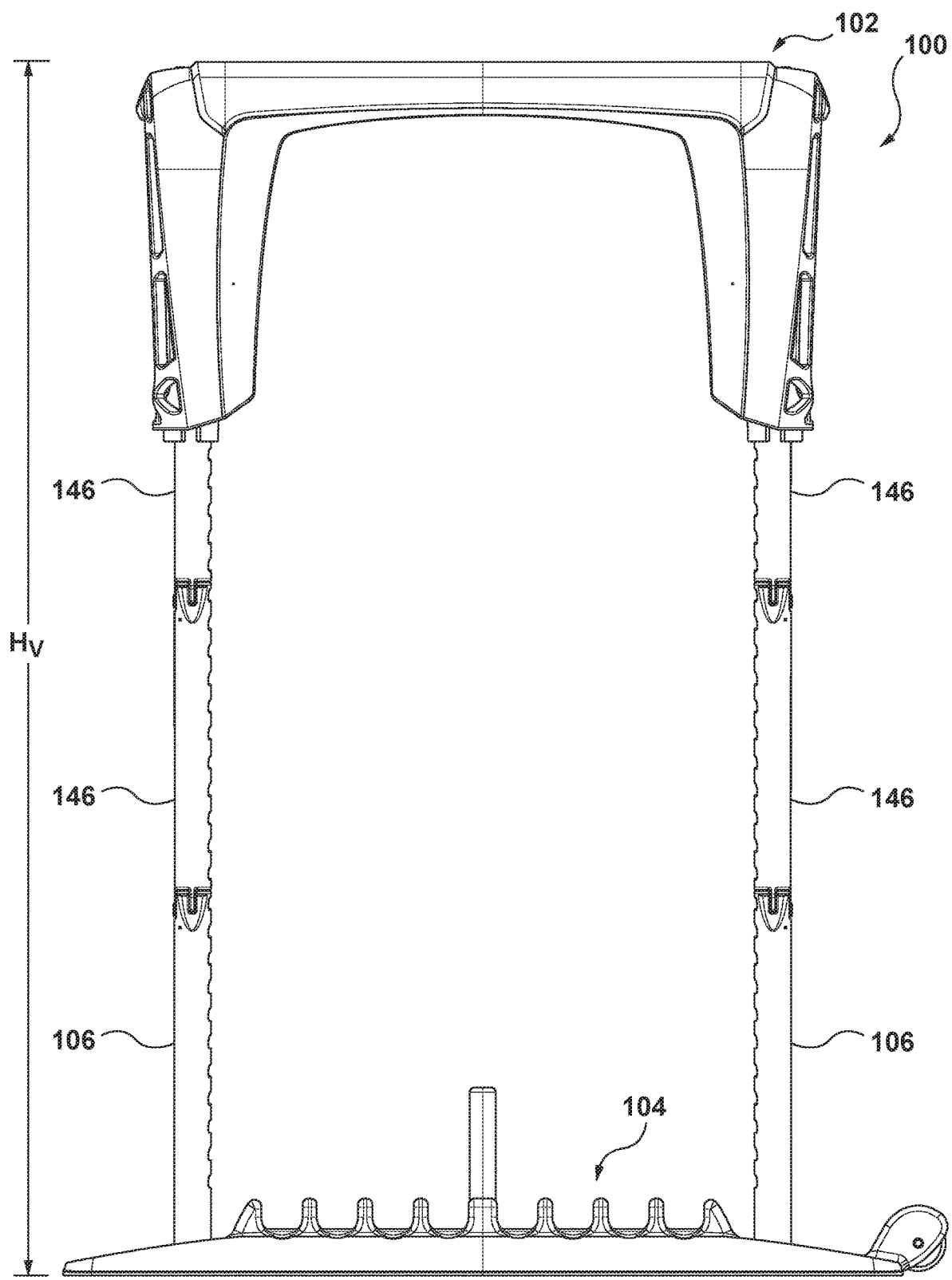
FIG. 14 is a side view of the adjustable height plyometric apparatus of FIG. 1 depicted at one of a vertical height attainable by the apparatus after coupling with two sets of upper leg components in accordance with an embodiment hereof.

The plyometric apparatus 100 may be used as shown with the base leg components 106 in FIG. 1 to achieve various vertical heights. In order to raise or lower the platform component 102, a user grasps inset handle elements 128 disposed on the left and right underside surfaces of the platform component to disengage the locking portions 131A, 131B of the locking devices 126 from the notches 156 of the leg components 106 to thereby allow the platform component 102 to slide up and down freely until a vertical height is secured by releasing the handle elements 128 to permit engagement between the locking portions 131A, 131B and the respective notches 156. Accordingly, for example, a vertical height of the platform component 102 may be increased from a minimum or base height of the platform $H_B$ (shown in FIG. 11) by engaging the pair of locking devices 126 with a set of same height notches 156 of the respective base leg components 106 to achieve a vertical height $H_V$ (shown in FIG. 12). Stated another way, a base vertical height of the plyometric apparatus 100 substantially corresponds to the base height $H_B$ of the platform component 102, with a particular vertical height of a selection of vertical heights for the platform component 102 there above corresponding to a particular set of respective notches 156 disposed at a same height on each of the base leg components 106. In an embodiment, the platform component 102 may be locked into place at linearly spaced intervals from a minimum height of 14" up to a maximum height of 44" plus. In order that the plyometric apparatus 100 may achieve a broader range or selection of vertical heights, first and/or second sets of upper leg components 146 may be utilized in a stackable arrangement with the base leg components 106 as shown in FIGS. 13 and 14 and described herein.

In the embodiment shown in FIGS. 5A-5D, a set of base leg components 106 includes, by way of example and not limitation, eleven notches so as to provide a selection of eleven elevations or vertical heights $H_V$ for the platform component 102. In an embodiment, the series of notches 156 may be spaced from each other by a distance of between 0.5 to 1.5 inches to allow a corresponding increase in the elevation or vertical height of the platform component 102 over the base height of $H_B$.

Figures 9C, 9D:
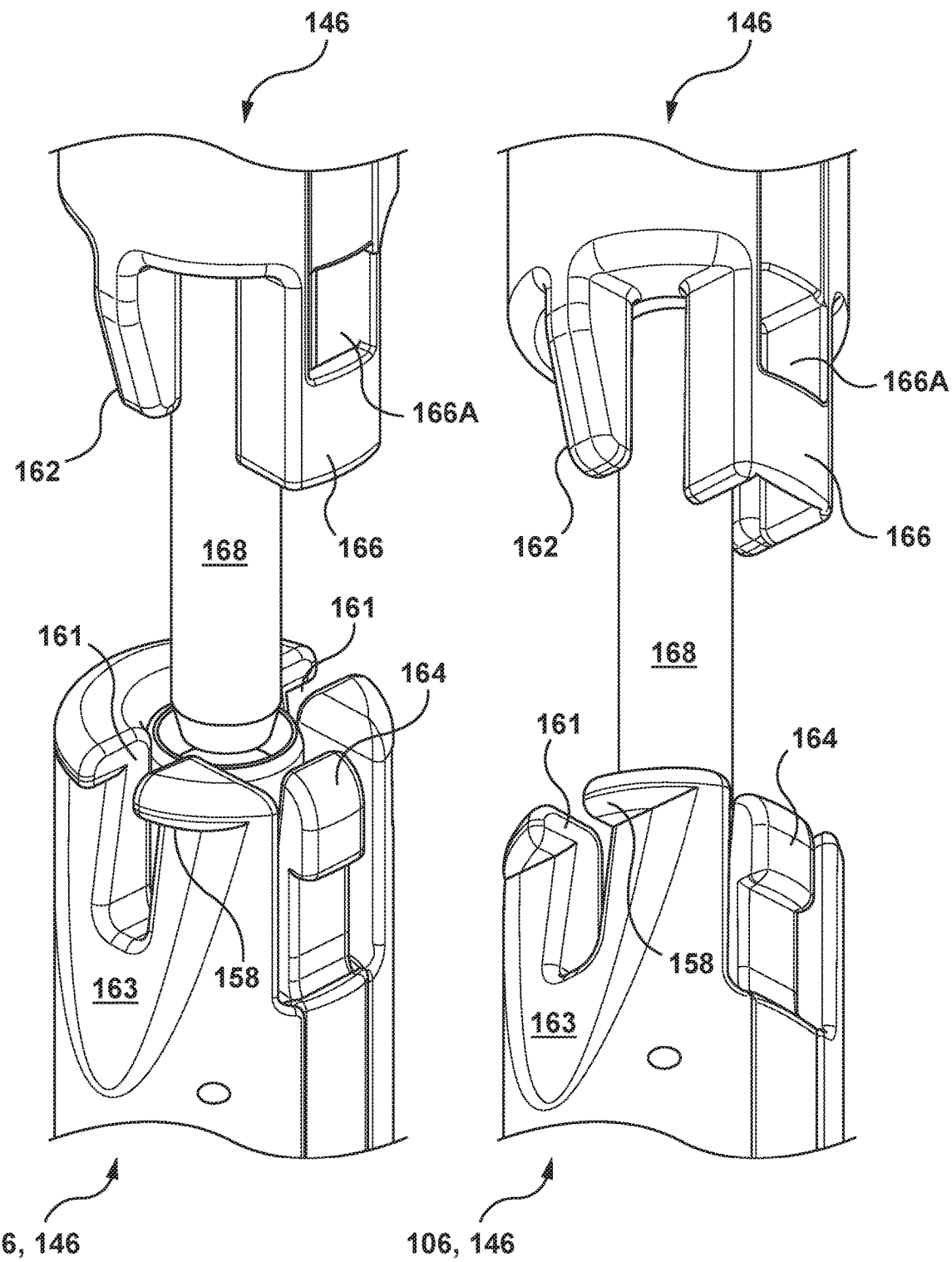

A first set of upper leg components 146 may be used to provide a further selection of incremental vertical heights for the platform component 102. The manner in which an upper leg component 146 is aligned and coupled with a base leg component 106, or another of an upper leg component 146, is now described with reference to FIGS. 8A-8E, FIGS. 9A-9D, FIGS. 10A-10E and FIG. 13. FIGS. 8A-8E are side sectional views of a bottom portion of an upper leg component 146 being coupled with a top portion of one of a base or upper leg component 106, 146, with the leg components being free of the remainder of the plyometric apparatus 100 for illustrative purposes. FIGS. 9A-9D are perspective views of a bottom portion of an upper leg component 146 being coupled with a top portion of one of a base or upper leg component 106, 146, with the leg components being free of the remainder of the plyometric apparatus 100 for illustrative purposes, wherein FIGS. 9A and 9B are shown in section. FIGS. 10A-10E illustrate operation of a hard-stop mechanism 140 and are side sectional views of a bottom portion of an upper leg component 146 being coupled with a top portion of one of a base or upper leg component 106, 146 (with the leg components being coupled within a channel 136 of a leg segment 132 of the platform superstructure 130 of the platform component 102). FIG. 13 illustrates a first set of upper leg components 146 being aligned with and inserted within respective leg receiving openings 125 of the platform component 102 for coupling with the set of base leg components 106 as depicted in FIGS. 8A-8E and 9A-9D.

In order to couple two leg components together, with reference to FIGS. 8A-8E and FIGS. 9A-9D, a respective projection 168 at a bottom end 151 of an upper leg component 146 engages with (slides within) a corresponding bore or aperture 167 within a top end 149 of a base or other upper leg component 106, 146. In an embodiment, the bore or aperture 167 within a top end 141 of the leg component may be an integrally formed feature of the outer layer 155 thereof. As would be understood by considering FIGS. 9C and 9D, during insertion of a top leg component (146) into a bottom leg component (106, 146) interaction between a pair of opposing ramped bosses 162 of an upper leg component 146 and a pair of opposing keyholes 161 of a respective base or other upper leg component 106, 146 function to locate or radially align the leg components during coupling. In order to lock the stacked leg components together, with reference to FIGS. 8C-8E and 9A, a spring-loaded leg lock 164 at the top end 149 of the lower leg component (106, 146) slides within an aperture 166A of a lock segment 166 of the upper leg component (146). In an embodiment, a lock segment 166 may have a ramped inner surface 166B for engaging with a head 164A of a spring-loaded leg lock 164 to thereby pivot the leg lock 164 as the upper leg component is slid into the lower leg component. In other embodiments, in addition to or in lieu of the locking mechanism described above coupling of stacked leg components may accomplished or aided by means of a tube connector button, magnets, or a combination of coupling mechanisms.

Figure 10B:
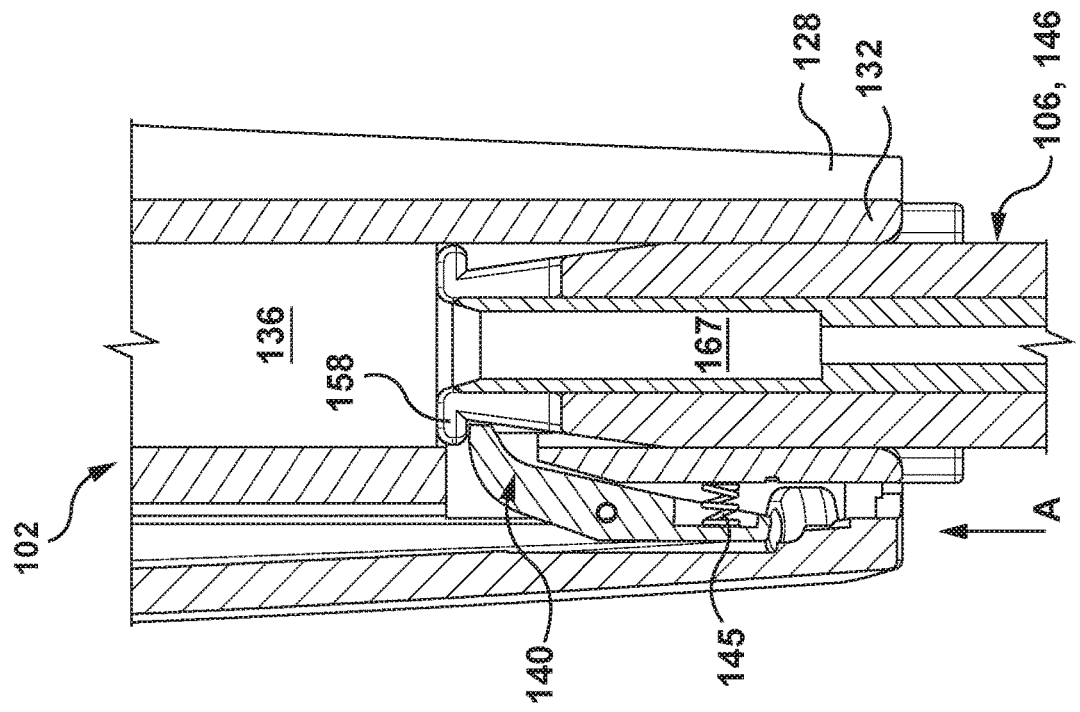
Figure 10A:
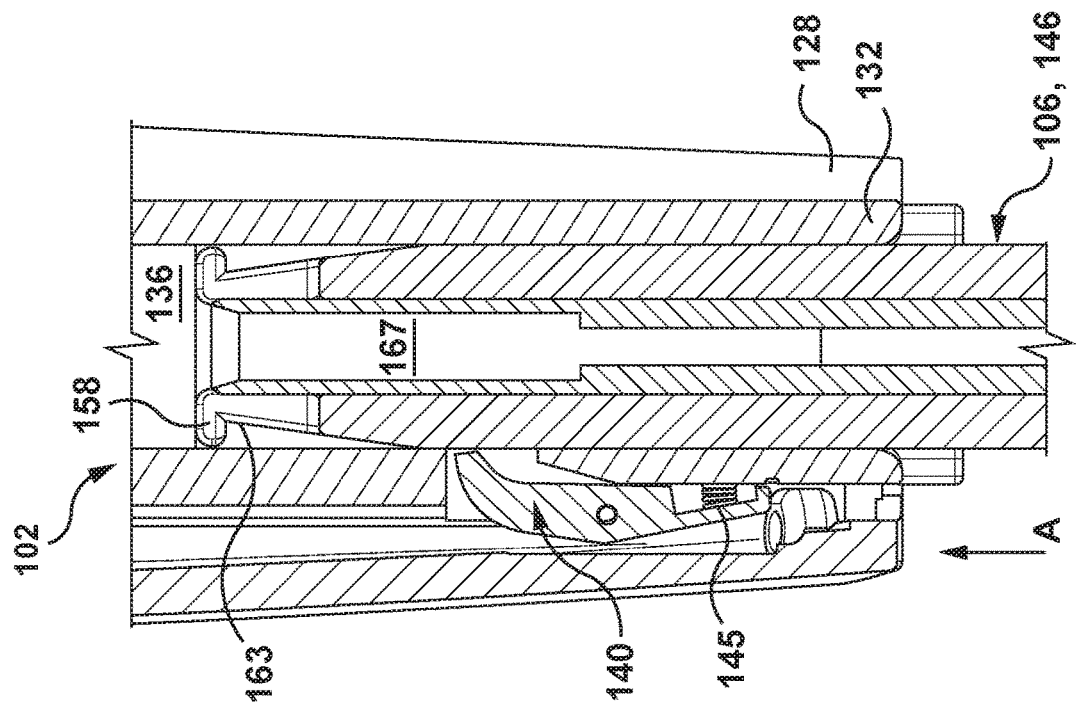
Figure 10E:
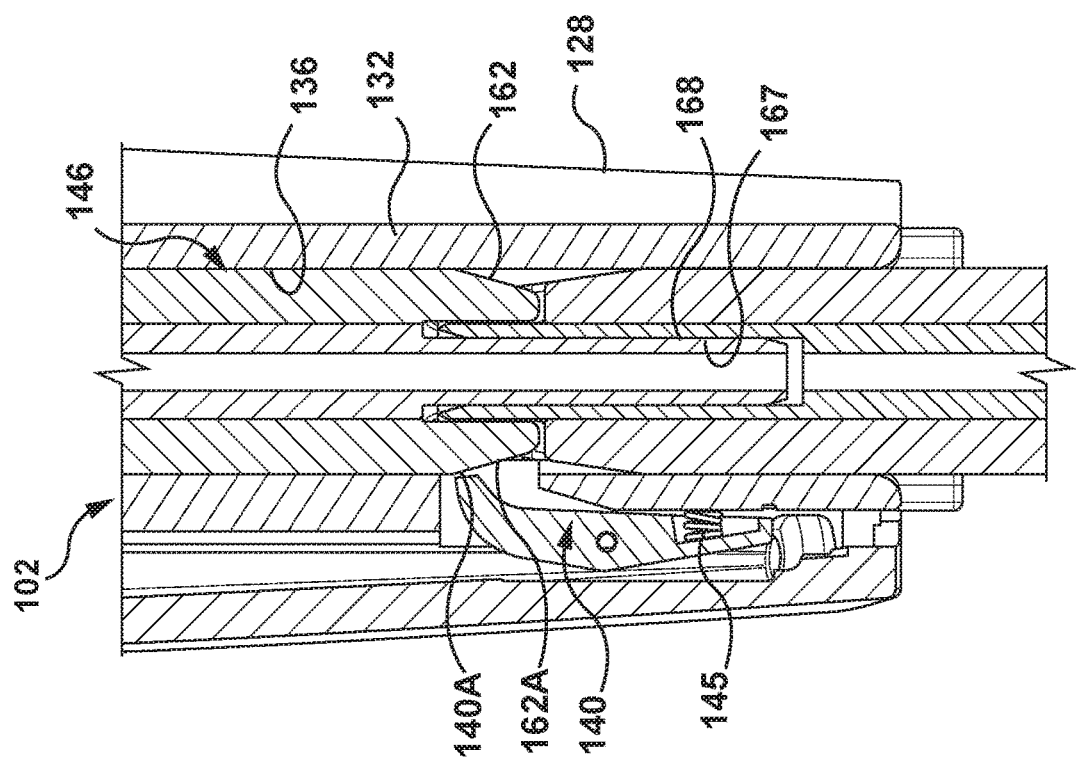

When the platform component 102 reaches a maximum height for a base leg component 106 or an inserted upper leg component 146, a hard-stop mechanism 140 is configured to prevent further upward movement. As noted above, FIGS. 10A-10E illustrate operation of the hard-stop mechanism 140. FIGS. 10A and 10B depict the platform component 102 being lifted or moved in the upward direction of arrow A with the hard-stop mechanism 140 being shown in a spring-loaded state with a spring 145 held in a compressed state while the hard-stop mechanism 140 slides on an exterior surface of a base leg component 106/upper leg component 146. When a head of the hard-stop mechanism slides within depression 163 the spring 145 releases to pivot the head of the hard-stop mechanism into the depression 163 and into engagement with an underside of flange 158. As shown in FIG. 10B, the hard-stop mechanisms 140 are configured to engage with respective flange 158 located at a top end of a respective leg component 106, 146 to prevent a user from unintentionally lifting the platform component 102 off of, or clear of, a set of leg components. When further vertical height is desired, with reference to FIGS. 10C-10E and 13, the upper leg components 146 include a pair of opposing ramped bosses 162 (defined by a bottom segment of the outer layers 155 thereof) and one of the ramped bosses 162 aligns with a respective hard-stop mechanism 140 to aid in compressing the spring 145 and thereby decoupling the hard-stop mechanism from a respective flange 158, to thereby permit the platform component 102 to be raised or lifted above the flange 158. More particularly, a respective ramped boss 162 slides into a corresponding keyhole 161 in the base or upper leg component 106, 146 and a respective ramp 162A of the ramped boss 162 pushes or guides the hard-stop lever 140A to an unlocked position in which the spring 145 is again in a loaded state allowing the platform component 102 to be moved above the set of lower leg components 106, 146. As would be understood from the above description, the interaction between a pair of opposing ramped bosses 162 of an upper leg component 146 and a pair of opposing keyholes 161 of a respective base or other upper leg component 106, 146 function to locate or radially align the leg components during coupling.

Figure 13A:
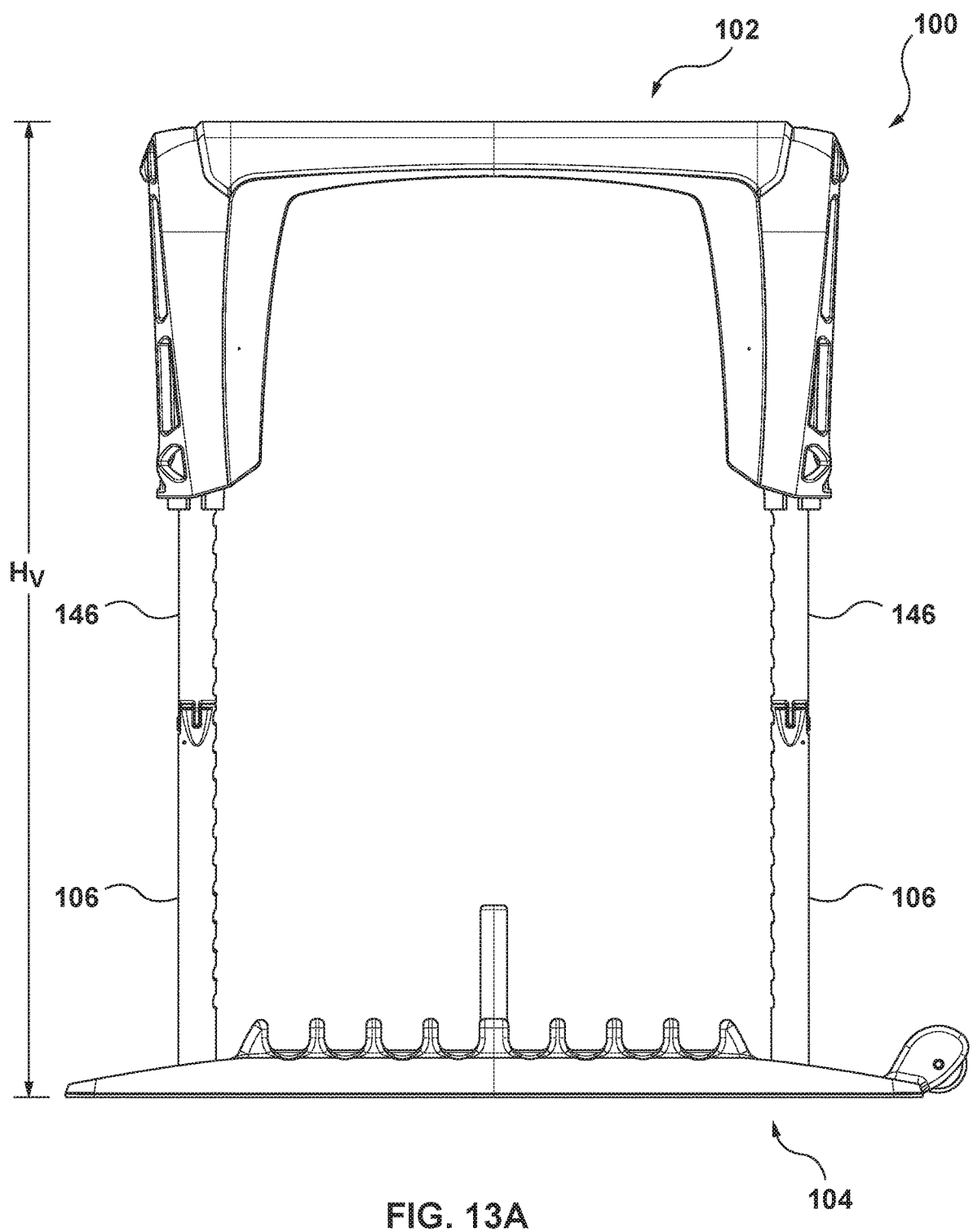
FIG. 13A is a side view of the adjustable height plyometric apparatus of FIG. 1 depicted at one of a vertical height attainable by the apparatus after coupling with a set of upper leg components in accordance with an embodiment hereof.

An alignment slot 159 (shown in FIGS. 5A, 5C, 7B, 7D and 7E) that runs a length of each leg component 146 acts as keying feature to properly radially locate the respective leg component upon insertion within the platform component 102. With reference to FIG. 13, optional matching keying features 133 that are sized to fit within the alignment slots 159 of the upper leg components 146 may be located within each leg receiving opening 125, which are formed by landing surface element 122, landing surface support 124 and handle elements 139 of the platform component 102 as described above. The matching key features 133 may be used in certain applications to radially orient the upper leg components 146 when each is initially inserted within the platform component 102, to thereby assure that a side of the upper leg component 146 having the series of notches thereon faces inward to be accessible by, and positioned for engagement with, a locking device 126. FIG. 13A depicts a side view of the platform component 102 attached to a first set of upper leg components 146, such that the platform component 102 is shown raised to a vertical height $H_V$ that is greater than a vertical height that may be achieved with solely the base leg components 106. In the embodiment shown in FIGS. 7A-7F, an upper leg component 146 includes by way of example and not limitation eleven notches such that the set of upper leg components 146 when coupled with the set of base leg components 106, as depicted in FIG. 13A, provides a selection of an additional eleven elevations or vertical heights $H_V$ for the platform component 102. Stated in another manner, by way of example and not limitation, the plyometric apparatus 100 may be selectively positioned at any one of twenty-two vertical heights offered by the combination of leg components depicted in FIG. 13A. In an embodiment, the series of notches 156 on an upper leg component 146 may be spaced from each other by a distance of between 0.5 to 1.5 inches to allow a corresponding incremental increase in the elevation or vertical height of the platform component 102.

It should be apparent from the description above that an adjustable height plyometric apparatus in accordance with embodiments hereof allows the platform component to be positioned at a multitude of vertical heights, with incremental increases between each height as is beneficial for jump training. For example, FIG. 14 depicts a side view of the platform component 102 attached to a second set of upper leg components 146, such that the platform component 102 is shown raised to a vertical height $H_V$ that is greater than a vertical height that may be achieved with solely the first set of upper leg components 146 and the base leg components 106 (as shown in FIG. 13). As similarly described above, a selection of an additional eleven elevations or vertical heights $H_V$ for the platform component 102 may be achieved with the plyometric apparatus 100 utilizing two sets of upper leg components 146 and one set of base leg components 106. Stated in another manner, by way of example and not limitation, the plyometric apparatus 100 may be selectively positioned at any one of thirty-three vertical heights offered by the combination of stacked leg components depicted in FIG. 14, such that the effective length of each leg is readily and easily increased in adjustable height plyometric apparatus in accordance herewith.

In an embodiment hereof, an adjustable height plyometric apparatus in accordance herewith may have a range of heights from a lowest height setting of fourteen inches to a maximum height setting of forty-seven inches. In embodiments hereof, each of the base and upper leg components may add ten or eleven inches in height. For instance, if a set of base leg components are configured to add eleven inches, with each notch 156 being separated from an adjacent notch by one inch, then a set of base leg components so configured may be used to provide adjustable height of between a base height of fourteen inches and a maximum height of twenty-five inches. A first set of upper leg components that are configured similarly to the set of base leg components may then be attached to enable the range to adjust from twenty-five inches to thirty-six inches. (It should be understood that the first set of upper leg components may be removed if a height lower that twenty-five inches is desired, such that a user may then lower the platform component 102 below twenty-five inches to remove the first set of upper leg components to make use of the apparatus between fourteen and twenty-five inches.) For a range of even higher vertical heights, a second set of upper leg components (configured similarly to the set of base leg components and first set of upper leg components) may then be attached to the first set of upper leg components to increase the viable exercise range to between thirty-six inches and forty-seven inches. It should be understood that the vertical height ranges provided in the foregoing paragraph are by way of example and not limitation. For instance, in order to provide a greater variety of ranges of vertical heights, the base leg components may be longer or shorter than one or more sets of the upper leg components, and/or a set or sets of upper leg components may be longer or shorter than another set or sets of upper leg components. As well, a spacing between the series of notches of a particular set of leg components need not be the same as the spacing between the series of notches of another set of leg components to which they are to be coupled. In this manner a more customized jump training regime may be developed, for instance, by choosing a set of base leg components having an incremental increase of one inch between notches and a first set of upper leg components having an incremental increase of a half an inch between notches.

In another embodiment, stability of the plyometric apparatus 100 may be enhanced by the addition of telescoping crossbars that connect at one end to the base component 104 and at another end to a respective upper leg component 146. In addition or alternatively, leg components disclosed herein may be formed to have a diameter of any suitable dimension for providing stability to a plyometric apparatus in accordance herewith. It should be understood that the relative proportions shown for various components of a plyometric apparatus in accordance herewith are by way of example and not limitation, as it would be understood by one of skill in the art that the relative proportions may be different than those shown without departing from the scope hereof.

Although in the embodiments described above a vertical height of the platform component 102 is described to be secured by the interaction between the locking portions or pawls 131A, 131B of the pair of spring-loaded locking/pawl devices 126 and respective notches 156 of the leg components 106, 146, other mechanical arrangements are contemplated that would suitably serve this function. In an embodiment, for example, the locking portions or pawls 131A, 131B (shown as wedge-shaped in FIG. 3) may be pin or rod shaped and the series of notches 156 may instead be a series of holes within the leg components 106, 146 that are shaped and sized to receive the pin or rod shaped locking portions therein.

A method of using an adjustable height plyometric apparatus in accordance with an embodiment hereof includes using the apparatus for water exercises/training, which is another key differentiator or attribute of apparatus in accordance herewith as compared to known jump equipment, which cannot be effectively used underwater or in a water environment.

In an embodiment, the materials selected for constructing an adjustable height plyometric apparatus in accordance herewith are not compromised by being used in water (for instance, will not corrode) and the padded features assure that a user will not be injured when jumping onto the submerged apparatus, which may not be easy to see at certain depths. As well, the ability to add weight to the base component assures stability and prevents buoyancy of the apparatus making it readily usable in a water environment, such as in a swimming pool.

In an embodiment optional water-proof antenna, or as referred to herein as a hydrotennae or hydrotenna, may be attached to extend to above water level from one or more corners of the submerged plyometric apparatus. In an embodiment, four hydrotennae may be utilized with each hydrotennae being secured at a first or lower end to the apparatus to demarcate a respective corner of the platform component 102. In an embodiment, the lower end of each hydrotennae may be configured to be seated within a top end of a respective leg component for securing the hydrotenna to the platform component 102. The hydrotenna may each extend or project upwards from the platform component 102 to a height of, for e.g., 8 feet, and may include a "bobble" atop a second or top end thereof.

As noted above, the hydrotenna are an optional accessory of a plyometric apparatus in accordance herewith. The hydrotenna are configured to stick out of or rise above the water surface, allowing a user to better triangulate for a safer landing atop the platform component 102 when exercising/training in the water. While jumping in water, a user of the plyometric apparatus without antenna will experience lower visibility of the apparatus due to water splashing about, and the hydrotenna permit better visualization for greater safety when using the plyometric apparatus in the water.

An additional safety feature of having hydrotenna secured to a submerged plyometric apparatus in accordance herewith is communication to individuals out of the water who will see the one or more hydrotenna sticking out of the water. The one or more hydrotenna may act as a warning to prevent such individuals from diving head first, or jumping into the water, and subsequently landing or hitting a fully submerged apparatus. The optional bobble atop the antenna may further enhance visibility of the submerged apparatus's position in the water. As well in embodiments hereof, a length of each hydrotennae may be at least seven feet, which when added to a base height of the plyometric apparatus, which may be fourteen inches, may then be provided with an effective length of eight feet. Such a length will provide ample height for the hydrotenna to be more visible to users and individuals out of water.

Another key feature of an adjustable height plyometric apparatus in accordance herewith is that it may be utilized to permit a user to exercise/train based upon the user's vertical jump height. Vertical jump height knowledge, real-time, allows for maximizing the user's exercise routine using the plyometric apparatus described herein. The assumption being, an individual training on a plyometric apparatus desires to achieve optimal results as soon as possible per their own physical potential.

In an embodiment, an optional antennae for use on land, or as referred to herein a vertennae, may be configured to be attached to a platform component 102 by being inserted into a leg component. An elongate base of the vertennae may vertically extend up to a height of six feet, then horizontally extend 18 inches, then again vertically extend upward to a maximum height of 12 feet. The horizontal or lateral extension of the vertennae allows someone to measure their vertical jump height with least risk of incidental impact with the plyometric apparatus.

In embodiments hereof, a vertennae may be labelled with heights ranging from six feet to twelve feet in order to permit the capture of an individual's jump height data. In embodiments hereof as one of ordinary skill in the art would recognize, a vertennae may be used to measure a user's height of reach, standing vertical jump height and/or dynamic jump height. Dynamic jump height includes an approach jump for volleyball players, a jump shot for basketball players, etc.

An example of the value of the use of a vertennae for providing real time feedback is when an athlete acquires a real time measurement of his/her vertical jump height and then uses this vertical jump height to set a height of the platform component 102 (for instance such that the platform height is at or slightly above the maximum jump height) and thereafter using the plyometric apparatus for shock training. Shock training involves drop jumps, depth jumps and altitude jumps. The most relevant to this example is an altitude jump, where one steps off of a plyometric apparatus from a height slightly above their maximum vertical jump height. Upon landing during an altitude jump exercise, the impact force of landing from a height above one's maximum vertical jump height sends electrical impulses through the individual's central nervous system to their brain. The message being, they are jumping higher than their maximum jump height. Overtime, this stimulates the central nervous system to thicken the myelin sheath surrounding the nervous system. A thicker myelin sheath produces a higher velocity electrical impulse when the brain directs the individual to vertically jump. A higher velocity electrical message or stimulus produces a vertical jump height higher than the individual's previous maximum jump height. This change in the central nervous system varies with age and health, but is notable approximately one week after performing the altitude jump routine, followed by two subsequent days of rest of low impact activity.

The present disclosure includes that contained in the appended claims as well as that of the foregoing description. Although embodiments of this invention have been described with a certain degree of particularity, it should be understood that the present disclosure has been made only by way of example and that numerous changes in the details of construction and combination and arrangement of parts may be resorted to without departing from the spirit and scope of the invention. Further while various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An adjustable height plyometric apparatus comprising:
a platform component;
a set of base leg components having elongate portions that are configured to be slidable within the platform component; and
a base component to which the set of base leg components are fixedly secured, wherein the elongate portions of the set of base leg components project upward from the base component,
wherein the platform component is configured to be slidably raised or lowered relative to the set of base leg components when in an unlocked state and selectively secured to the set of base leg components at first selection of vertical heights when in a locked state, and
wherein top portions of the set of base leg components remain below a top surface of the platform component at each of the first selection of vertical heights; and
a first set of upper leg components securable to the set of base leg components for providing a second selection of vertical heights; and
a second set of upper leg components securable to the first set of upper leg components for providing a third selection of vertical heights.

2. The plyometric apparatus of claim 1,
wherein the platform component includes a pair of locking devices, and
wherein each of the set of base leg components includes a longitudinally-extending series of notches, each notch of the longitudinally-extending series of notches being configured to receive a locking portion of a locking device of the pair of locking devices when the platform component is in the locked state at one of the selection of vertical heights.

3. The plyometric apparatus of claim 2, wherein each notch of the longitudinally-extending series of notches provides a different vertical height of the selection of vertical heights at which the platform component is configured to be secured.

4. The plyometric apparatus of claim 2, wherein the pair of locking devices are spring-loaded and configured to be actuated by a user at either side of the platform component.

5. The plyometric apparatus of claim 1, wherein above a base vertical height that substantially corresponds to a base height of the platform component, a particular vertical height in the selection of vertical heights corresponds to a set of notches with each notch of the set of notches being at a same height on each base leg component of the set of base leg components.

6. The plyometric apparatus of claim 5, wherein each base leg component includes a plurality of notches that are evenly spaced along a length of the base leg component to provide for the selection of vertical heights above the base vertical height.

7. The plyometric apparatus of claim 6, wherein the selection of vertical heights is a range of vertical heights of between a first vertical height of fourteen inches and a maximum vertical height of forty-six inches.

8. The plyometric apparatus of claim 1, wherein each of the first set of upper leg components is inserted within a respective leg receiving opening in a top surface of the platform component for coupling with a respective base leg component of the set of base leg components.

9. The plyometric apparatus of claim 1, wherein the platform component is configured to be simultaneously raised or lowered relative to the first set of upper leg components in the unlocked state when the first set of upper leg components is secured to the set of base leg components.

10. The plyometric apparatus of claim 1, wherein each of the second set of upper leg components is inserted within a respective leg receiving opening in the top surface of the platform component for coupling with a respective upper leg component of the first set of upper leg components disposed therein.

11. The plyometric apparatus of claim 1, wherein the platform component is configured to be simultaneously raised or lowered relative to the second set of upper leg components in the unlocked state when the second set of upper leg components is secured to the first set of upper leg components.

12. The plyometric apparatus of claim 1, further comprising:
a hard-stop mechanism associated with the platform component and being configured to prevent the platform component from being lifted free of the set of base leg components when the platform component is being raised relative to the set of base leg components in the unlocked state.

13. The plyometric apparatus of claim 12, wherein the hard-stop mechanism is configured to slide along an exterior surface of a respective base leg component of the set of base leg components until it engages with a stop at a top end of the respective base leg component.

14. An adjustable height plyometric apparatus comprising:
a platform component having a top surface with leg receiving openings therein, wherein a planar landing surface forms a portion of the top surface of the platform component, the planar landing surface being configured to receive a user of the adjustable height plyometric apparatus thereon;
a set of base leg components having elongate portions that are configured to be slidable within the platform component;
a base component to which the set of base leg components are fixedly secured, wherein the elongate portions of the set of base leg components project upward from the base component; and
a set of upper leg components for attachment to the set of base leg components, wherein each of the upper leg components of the set of upper leg components being is configured to be slidable within the leg receiving openings in the top surface of the platform component for coupling with a respective base leg component of the set of base leg components,
wherein the platform component is configured to be simultaneously raised or lowered relative to the set of base leg components when in an unlocked state and selectively secured to the set of base leg components at a first selection of vertical heights when in a locked state, and
wherein the set of upper leg components are attachable to top portions of the set of base leg components and, when the set of upper leg components is attached to the set of base leg components, the platform component is configured to be simultaneously raised or lowered relative to the set of upper leg components when in the unlocked state and selectively secured to the set of upper leg components at a second selection of vertical heights when in the locked state.

15. The plyometric apparatus of claim 14, wherein above a base vertical height that substantially corresponds to a base height of the platform component, a particular vertical height in the first or second selection of vertical heights corresponds to a set of notches with each notch of the set of notches being at a same height on each base leg component of the set of base leg components or each upper leg component of the set of upper leg components.

16. The plyometric apparatus of claim 15,
- wherein the platform component includes a pair of locking devices, and
- wherein each of the set of base leg components and each of the set of upper leg components includes a plurality of notches that are evenly spaced along a length of each of the base or upper leg components thereof to provide for the first selection or second selection of vertical heights, with each notch of the plurality of notches being configured to receive a locking portion of a locking device of the pair of locking devices when the platform component is in the locked state at one of the first selection or second selection of vertical heights.

* * * * *